(12) United States Patent
Akutsu et al.

(10) Patent No.: US 7,502,168 B2
(45) Date of Patent: Mar. 10, 2009

(54) OPTICAL DEVICE AND IMAGE DISPLAY APPARATUS

(75) Inventors: Katsuyuki Akutsu, Kanagawa (JP); Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 355 days.

(21) Appl. No.: 11/534,730

(22) Filed: Sep. 25, 2006

(65) Prior Publication Data

US 2007/0070504 A1 Mar. 29, 2007

(30) Foreign Application Priority Data

Sep. 29, 2005 (JP) ............................. 2005-285397

(51) Int. Cl.
*G02B 5/18* (2006.01)
(52) U.S. Cl. .......................... 359/573; 359/15; 359/630
(58) Field of Classification Search ................. 359/573, 359/572, 630, 15
See application file for complete search history.

(56) References Cited

U.S. PATENT DOCUMENTS 5,682,255 A * 10/1997 Friesem et al. ............... 359/15
6,169,613 B1 * 1/2001 Amitai et al. ................ 359/15
2004/0004767 A1 * 1/2004 Song .......................... 359/566

FOREIGN PATENT DOCUMENTS

| JP | 8-507879 | 8/1996 |
| JP | 2002-162598 | 6/2002 |
| WO | 94/19712 | 9/1994 |

* cited by examiner

*Primary Examiner*—Fayez G Assaf
(74) *Attorney, Agent, or Firm*—Sonnenschein Nath & Rosenthal LLP

(57) ABSTRACT

An optical device includes a light guide plate, and first and second reflective volume hologram diffraction grating members. The first member has interference fringes extending from therewithin towards surfaces thereof and arranged at an equal pitch. Each interference fringe and each surface of the first member form an inclination angle therebetween. The first member has the following conditions. (a) In an outer region positioned farther away from the second member than a minimum inclination angle region having a minimum inclination angle, the inclination angles of the interference fringes increase with increasing distance from the minimum inclination angle region. (b) In an inner region positioned closer to the second member than the minimum inclination angle region, the inclination angles of the interference fringes include a maximum inclination angle in an inner area disposed adjacent to the minimum inclination angle region and decrease with increasing distance from the minimum inclination angle region.

14 Claims, 14 Drawing Sheets

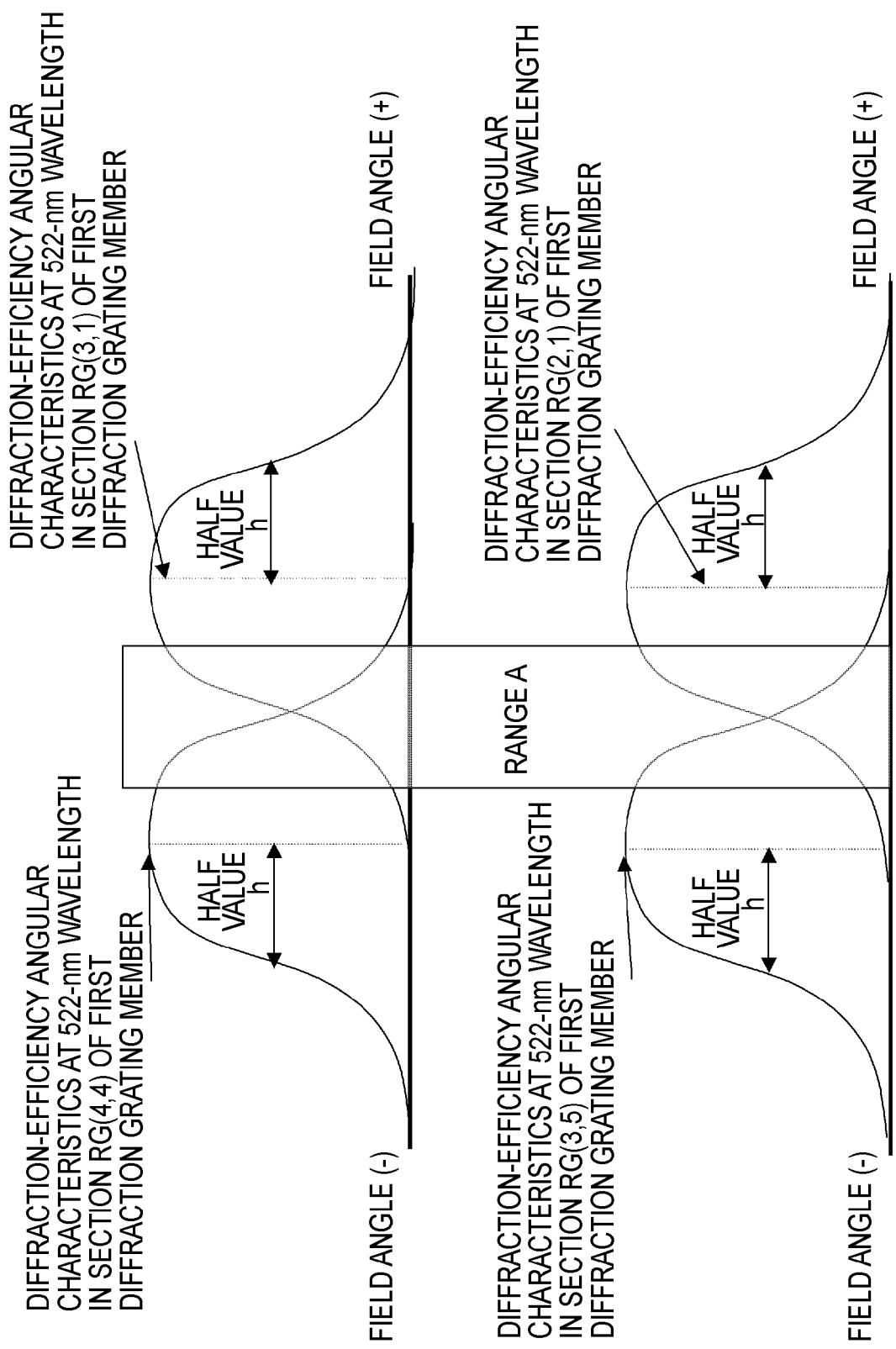

| RG1_1 | RG1_2 | RG1_3 | RG1_4 | RG1_5 | RG1_6 | |
|---|---|---|---|---|---|---|
| $VG_{(1,1)}$ | $VG_{(2,2)}$ | $VG_{(3,1)}$ | $VG_{(4,1)}$ | $VG_{(5,2)}$ | $VG_{(6,1)}$ | ~130B |
| $VG_{(1,2)}$ | $VG_{(2,1)}$ | $VG_{(3,2)}$ | $VG_{(4,2)}$ | $VG_{(5,1)}$ | $VG_{(6,2)}$ | ~130A |

| $VG_{(1,2)}$ | $VG_{(2,2)}$ | $VG_{(3,2)}$ | $VG_{(4,2)}$ | $VG_{(5,2)}$ | $VG_{(6,2)}$ | ~230B |
|---|---|---|---|---|---|---|
| $VG_{(1,1)}$ | $VG_{(2,1)}$ | $VG_{(3,1)}$ | $VG_{(4,1)}$ | $VG_{(5,1)}$ | $VG_{(6,1)}$ | ~230A |

| $VG_{(1,1)}$ | $VG_{(2,1)}$ | $VG_{(3,1)}$ | $VG_{(5,1)}$ | $VG_{(6,1)}$ | ~230B |
|---|---|---|---|---|---|
| $VG_{(1,2)}$ | $VG_{(2,2)}$ | $VG_{(3,2)}$ | $VG_{(4,2)}$ | $VG_{(5,2)}$ | $VG_{(6,2)}$ | ~230A |

OPTICAL DEVICE AND IMAGE DISPLAY APPARATUS

CROSS REFERENCES TO RELATED APPLICATIONS

The present invention contains subject matter related to Japanese Patent Application JP 2005-285397 filed in the Japanese Patent Office on Sep. 29, 2005, the entire contents of which are incorporated herein by reference.

BACKGROUND OF THE INVENTION

1. Field of the Invention

The present invention relates to an optical device that allows an observer to observe a two-dimensional image formed by an image forming device, and to an image display apparatus equipped with the optical device.

2. Description of the Related Art

PCT Japanese Translation Patent Publication No. 8-507879 and Japanese Unexamined Patent Application Publication No. 2002-162598 disclose known examples of a virtual-image display apparatus equipped with a hologram diffraction grating. Such an apparatus allows an observer to observe a two-dimensional image formed by an image forming device as a virtual image magnified by a virtual-image optical system.

FIG. 11 schematically illustrates a virtual-image display apparatus disclosed in PCT Japanese Translation Patent Publication No. 8-507879. The virtual-image display apparatus includes an image forming device 101, a light guide plate 102, a transmissive hologram lens 103, and a transmissive hologram diffraction grating 104. Image light displayed on the image forming device 101 is emitted to the light guide plate 102, and is then collimated by the transmissive hologram lens 103 provided within the light guide plate 102. Inside the light guide plate 102, the image light is deflected by an angle for total reflection. Subsequently, the image light travels through the light guide plate 102 while undergoing total reflection therein, and then enters the transmissive hologram diffraction grating 104 where the image light is diffracted. The transmissive hologram diffraction grating 104 is provided on the same axis line as the transmissive hologram lens 103 within the light guide plate 102 and is separated from the transmissive hologram lens 103 by a predetermined distance. The diffracted image light is released from the light guide plate 102 as collimated light and is guided towards an eye of an observer.

On the other hand, FIGS. 12A and 12B schematically illustrate a virtual-image display apparatus disclosed in Japanese Unexamined Patent Application Publication No. 2002-162598. This virtual-image display apparatus includes an image forming device 201, a free-form-surface prism 202, a light guide plate 203, a first holographic optical element 204, a second holographic optical element 205, a third holographic optical element 206, and a fourth holographic optical element 207. Each of the holographic optical elements will simply be referred to as HOE hereinafter. Image light displayed on the image forming device 201 travels through the free-form-surface prism 202 so as to enter the light guide plate 203. The image light incident on the light guide plate 203 is continuously diffracted and reflected by the first HOE 204, which is provided on a surface of the light guide plate 203 opposite to an incidence surface thereof, and by the second HOE 205, which is provided on the incidence surface of the light guide plate 203. In this case, the image light is set to a critical angle or more so as to undergo total reflection within the light guide plate 203. The image light with the critical angle or more travels through the light guide plate 203 while undergoing total reflection within the light guide plate 203, and is then continuously diffracted and reflected by the fourth HOE 207 and the third HOE 206 so as to be given the critical angle or less. The image light is released from the light guide plate 203 and is guided towards an eye of an observer.

SUMMARY OF THE INVENTION

The virtual-image display apparatus disclosed in PCT Japanese Translation Patent Publication No. 8-507879 has three main problems, which will be described below.

Firstly, in this virtual-image display apparatus, the image light emitted from the image forming device 101 directly enters the transmissive hologram lens 103 in the light guide plate 102. If the distance between the image forming device 101 and the transmissive hologram lens 103 (that is, a focal distance of the transmissive hologram lens 103) is shortened in order to increase the magnifying power of the optical system in the virtual-image display apparatus, it is difficult to attain a large pupil diameter 105 due to the fact that the acceptable angle for diffraction by the transmissive hologram lens 103 is relatively small. Moreover, since interference fringes to be formed on the transmissive hologram lens 103 have a complicated pattern with an aspherical phase component, it is difficult to provide the interference fringes in multiple numbers to increase the acceptable angle for diffraction by the transmissive hologram lens 103 in order to increase the pupil diameter, or is difficult to give the transmissive hologram lens 103 a multilayer structure. This implies that, at the same wavelength and at the same incident angle, it is difficult to attain different diffraction efficiencies while maintaining an equal diffraction angle.

Secondly, in this virtual-image display apparatus, the transmissive hologram lens 103 provided in the light guide plate 102 deflects the image light emitted from the image forming device 101 while simultaneously collimating the image light (i.e. while generating an optical power). This may cause a monochromatic eccentric aberration to a large degree, which can reduce the resolution of a display image to be guided to the eye.

Furthermore, in this virtual-image display apparatus, although a chromatic aberration produced in the transmissive hologram lens 103 is corrected by the transmissive hologram diffraction grating 104, since the deflecting direction for incident light by the transmissive hologram diffraction grating 104 is limited to a direction parallel to the page of FIG. 11, it is difficult to eliminate at least an aberration occurring in a direction perpendicular to the page. The chromatic aberration occurring in the transmissive hologram lens 103 is due to the two different transmissive hologram optical elements provided in the light guide plate 102 (which are the transmissive hologram lens 103 and the transmissive hologram diffraction grating 104). This problem leads to a significant limiting condition that permits only the use of a light source having a narrow wavelength range. In fact, a simulation was actually performed on the virtual-image display apparatus shown in FIG. 11 by reverse ray tracing from the eye. The result of this simulation showed that even if the chromatic aberration is corrected by the two transmissive hologram optical elements, there was a displacement of ±30 μm on the image forming device 101 when the wavelength was shifted by ±2 nm.

Thirdly, even if the two transmissive hologram optical elements (i.e. the transmissive hologram lens 103 and the transmissive hologram diffraction grating 104) are replaced with two identical transmissive volume hologram diffraction gratings not having an optical power, the following problem exists.

Generally, at a certain incident angle, a diffraction acceptable wavelength range of a transmissive volume hologram diffraction grating is known to be wider than that of a reflective volume hologram diffraction grating. Consequently, if the wavelength range of light that forms the image light emitted from the image forming device 101 is wide, or if the image forming device 101 is defined by light sources (red-light emitting light source, green-light emitting light source, blue-light emitting light source) that emit the three primary colors RGB (R: red light, G: green light, B: blue light) of light, and if the interval of the wavelength of light to be emitted from each light source is short (meaning that if the wavelength range of light to be emitted from each light source is wide), chromatic dispersion caused by enormous diffraction, namely, diffractive chromatic dispersion, may occur. For example, a transmissive volume hologram diffraction grating for green light (center wavelength of 550 nm) has a diffraction efficiency of about 10% of a wavelength range of about 400 to 630 nm, which means that the transmissive volume hologram diffraction grating for green light may unfavorably diffract a portion of light emitted from a blue light emitting diode (light emitting wavelength range of 410 to 490 nm) and a red light emitting diode (light emitting wavelength range of 600 to 660 nm).

A chromatic aberration caused by diffractive chromatic dispersion can be eliminated by using two hologram diffraction gratings having interference fringes that are arranged at the same pitch. However, if the degree of chromatic dispersion occurring in one of the hologram diffraction gratings is large, the expansion of light transmitted through the light guide plate becomes large. This means that when the light is diffracted by the other hologram diffraction grating and then emitted from the light guide plate, the propagating direction of the light broadens significantly depending on the wavelength, thus impairing the evenness in color of a virtual image to be displayed on an eye of an observer.

On the other hand, in the virtual-image display apparatus disclosed in Japanese Unexamined Patent Application Publication No. 2002-162598, because an image from the image forming device 201 is intermediately formed within the light guide plate 203, it may be necessary for the first HOE 204, the second HOE 205, the third HOE 206, and the fourth HOE 207 to have optical power in an eccentric layout. Thus, this virtual-image display apparatus has a problem in that an eccentric aberration may occur. In order to alleviate such an eccentric aberration in this virtual-image display apparatus, the free-form-surface prism 202, the first HOE 204, the second HOE 205, the third HOE 206, and the fourth HOE 207 are disposed in a non-axis-symmetrical fashion. However, since an upper limit of the diffraction efficiency of each HOE is substantially between 70% and 80%, the total diffraction efficiency of the four HOEs equals 70 to 80% raised to the fourth power. Thus, the diffraction efficiency is significantly lowered. Furthermore, light beams within the light guide plate 203 that are not diffracted by the first HOE 204 and the second HOE 205 do not enter the third HOE 206 and the fourth HOE 207. Consequently, this is problematic in that it is difficult to improve the light usability and to expand the observable range.

The present applicant has proposed in Japanese Patent Application No. 2004-97222 a virtual-image display apparatus for solving the problems in the virtual-image display apparatus disclosed PCT Japanese Translation Patent Publication No. 8-507879 and Japanese Unexamined Patent Application Publication No. 2002-162598.

Referring to FIG. 13, a virtual-image display apparatus 300 includes an image forming device 301 that displays an image, and a virtual-image optical system which receives image light displayed on the image forming device 301 and guides the image light towards an eye 306 of an observer. Specifically, the virtual-image optical system includes a collimator optical unit 305, a light guide plate 302, and a first reflective volume hologram diffraction grating 303 and a second reflective volume hologram diffraction grating 304 which are both provided on the light guide plate 302. The collimator optical unit 305 receives light beams emitted from corresponding pixels in the image forming device 301. The collimator optical unit 305 generates a collimated beam group including a plurality of collimated beams with different incident angles with respect to the light guide plate 302, and emits the collimated beam group towards the light guide plate 302. One end of the light guide plate 302 corresponds to a light incident portion 302A which is where the collimated beam group emitted from the collimator optical unit 305 enters, and the other end of the light guide plate 302 corresponds to a light exit portion 302B from which the collimated beam group is emitted outward. The collimated beam group enters and exits from the light guide plate 302 from one optical surface (front face) 302C thereof. On the other hand, the other optical surface (back face) 302D of the light guide plate 302, which is parallel to the optical surface 302C of the light guide plate 302, has the first reflective volume hologram diffraction grating 303 and the second reflective volume hologram diffraction grating 304 attached thereto.

The collimated beam group including the collimated beams entering the light incident portion 302A of the light guide plate 302 with different incident angles enters the first reflective volume hologram diffraction grating 303 where the collimated beams are diffracted and reflected. The diffracted collimated beam group travels through the light guide plate 302 while undergoing total reflection between the optical surfaces 302C and 302D, and enters the second reflective volume hologram diffraction grating 304. The collimated beam group incident on the second reflective volume hologram diffraction grating 304 is diffracted and reflected so as to become free from the total reflection condition. Subsequently, the collimated beam group is emitted from the light exit portion 302B so as to be guided towards the eye 306 of the observer.

The pattern of interference fringes formed within the second reflective volume hologram diffraction grating 304 and the pattern of interference fringes formed within the first reflective volume hologram diffraction grating 303 are symmetrical to each other with respect to an imaginary plane extending perpendicular to an axis line of the light guide plate 302. Accordingly, the collimated beam group to be diffracted and reflected by the second reflective volume hologram diffraction grating 304 is diffracted and reflected by the same angle as the incident angle of the collimated beam group on the first reflective volume hologram diffraction grating 303. Thus, a high-resolution display image can be displayed on the eye 306 without image blur.

Accordingly, the virtual-image display apparatus 300 is provided with the first reflective volume hologram diffraction grating 303 and the second reflective volume hologram diffraction grating 304, which have no lens effect, whereby monochromatic eccentric aberration and diffractive chromatic aberration can be eliminated or reduced.

The interference fringes formed within the first reflective volume hologram diffraction grating 303 and the second reflective volume hologram diffraction grating 304 of the virtual-image display apparatus 300 are provided in multiple numbers, or the diffraction gratings have a multilayer structure. The interference fringes have a fixed inclination angle (i.e. a fixed angle formed between each interference fringe and a surface of each of the first reflective volume hologram diffraction grating 303 and the second reflective volume hologram diffraction grating 304). Furthermore, since the incident angle of the plurality of collimated beams on the first reflective volume hologram diffraction grating 303 varies depending on the emission position from the image forming device 301, the diffraction wavelengths that satisfy a Bragg condition differ in various regions of the first reflective volume hologram diffraction grating 303. As a result, the diffraction efficiency of light beams that are diffracted and reflected in the various regions of the first reflective volume hologram diffraction grating 303 varies. Specifically, referring to FIG. 14, if light incident on the first reflective volume hologram diffraction grating 303 has a certain wavelength range, the wavelengths that are diffracted with the highest efficiency vary depending on the emission position from the image forming device 301. This leads to uneven coloring in a pixel image guided to the eye in accordance with pixel positions in the image forming device 301. In FIG. 14, wavelengths $\lambda_1, \lambda_2, \lambda_3$ represent wavelengths that are diffracted with the highest efficiency depending on the emission position from the image forming device 301. On the other hand, in a case where light incident on the first reflective volume hologram diffraction grating 303 has a single wavelength, if the diffraction efficiency varies depending on the emission position from the image forming device 301, unevenness in luminance may be induced.

It is desirable to provide an optical device in which unevenness in color and luminance dependant on incident angles of collimated beams can be reduced, and to provide an image display apparatus equipped with such an optical device.

An optical device according to an embodiment of the present invention includes a light guide plate which receives a collimated beam group including a plurality of collimated beams traveling in different directions, the collimated beam group traveling through the light guide plate while undergoing total reflection therein and then exiting from the light guide plate, a first diffraction grating member including a reflective volume hologram diffraction grating that diffracts and reflects the collimated beam group incident on the light guide plate so as to allow the collimated beam group to undergo total reflection within the light guide plate, and a second diffraction grating member including a reflective volume hologram diffraction grating that diffracts and reflects the collimated beam group transmitted through the light guide plate and directly emits the collimated beam group from the light guide plate. The first diffraction grating member is provided with interference fringes extending from within the first diffraction grating member towards surfaces thereof, the interference fringes on the surfaces of the first diffraction grating member being arranged at an equal pitch. When an angle formed between each of the interference fringes in the first diffraction grating member and each surface of the first diffraction grating member is defined as an inclination angle, the first diffraction grating member has the following conditions:

(a) the first diffraction grating member has a minimum inclination angle region having an interference fringe with a minimum inclination angle and an outer region positioned farther away from the second diffraction grating member than the minimum inclination angle region, and the inclination angles of the interference fringes in the outer region increase with increasing distance from the minimum inclination angle region, and (b) the first diffraction grating member has an inner region positioned closer to the second diffraction grating member than the minimum inclination angle region, and the inclination angles of the interference fringes in the inner region include a maximum inclination angle in an inner area disposed adjacent to the minimum inclination angle region and decrease with increasing distance from the minimum inclination angle region.

An image display apparatus according to an embodiment of the present invention includes an image forming device, a collimator optical unit configured to collimate light beams emitted from the image forming device, and the optical device according to the above-referenced embodiment, which receives the collimated beams collimated and oriented in different directions by the collimator optical unit, and then guides and emits the collimated beams.

In the optical device and the image display apparatus according to the above-referenced embodiments, there is a case where the first diffraction grating member does not have a region that extends farther away from the second diffraction grating member from the minimum inclination angle region having the interference fringe with the minimum inclination angle. In that case, the condition (a) is disregarded. In contrast, there is a case where the first diffraction grating member does not have a region that extends closer towards the second diffraction grating member from the minimum inclination angle region. In that case, the condition (b) is disregarded.

In the above-referenced embodiments of the present invention, the interference fringes in the first diffraction grating member preferably include P kinds of interference fringes so as to set substantially the same angle for diffraction and reflection of P kinds of light beams having different wavelength ranges (or wavelengths) and defining the collimated beams, P being an integer. Accordingly, this structure contributes to an increase in diffraction efficiency, an increase in acceptable angle for diffraction, and optimization of diffraction angles when the collimated beams having different wavelength ranges (or wavelengths) are diffracted and reflected by the first diffraction grating member. The P types of interference fringes that diffract and reflect collimated beams of certain incident angles have the same inclination angle regardless of the wavelength ranges (or wavelengths) of the collimated beams. The phrase "P kinds of interference fringes" may sometimes be referred to as "the interference fringes are provided in multiple numbers (P kinds)".

Preferably, in the above-referenced embodiments of the present invention, when the center of the second diffraction grating member is defined as a point of origin, when a normal line of the second diffraction grating member extending through the point of origin is defined as an X-axis, when an axis line of the light guide plate extending through the point of origin is defined as a Y-axis, when an angle formed by an observation point on the X-axis for observing an image corresponding to the collimated beam group diffracted and reflected by the second diffraction grating member and released from the light guide plate and one of the collimated beams positioned closest to the first diffraction grating member is defined as a field angle $\theta=\theta_0$ (>0), and when an angle formed by the observation point and another one of the collimated beams positioned farthest from the first diffraction grating member is defined as a field angle $\theta=-\theta_0$ (<0), the collimated beams being diffracted and reflected by the second diffraction grating member and positioned within an X-Y plane, a collimated beam corresponding to the collimated beam to be given the field angle $\theta=\theta_0$ is diffracted and reflected by the first diffraction grating member at a position where the interference fringe having the maximum inclination angle is provided, and a collimated beam corresponding to the collimated beam to be given the field angle $\theta = -\theta_0$ is diffracted and reflected by the first diffraction grating member at a position where the interference fringe having the minimum inclination angle is provided.

In detail, the term "field angle" refers to a viewing angle when an object range of an optical system is viewed from an image space of the optical system.

Alternatively, in the above-referenced embodiments of the present invention, the first diffraction grating member may include diffraction grating layers defined by Q layers of reflective volume hologram diffraction gratings, Q being an integer. In that case, the interference fringes are provided in each of the diffraction grating layers of the first diffraction grating member and extend from within each diffraction grating layer towards surfaces thereof. Moreover, the interference fringes on the surfaces of each diffraction grating layer are arranged at an equal pitch, and the interference fringes in the diffraction grating layers are arranged at the same pitch. This multilayer structure contributes to a reduction in length of the first diffraction grating member in the axial direction of the light guide plate, a thickness reduction of the light guide plate, and an increased range of incident angles for collimated beams that can be diffracted and reflected by the first diffraction grating member.

Furthermore, in that case, the diffraction grating layers in the first diffraction grating member may have different minimum inclination angles and different maximum inclination angles with respect to each other. Alternatively, a minimum inclination angle in at least one of the diffracting grating layers of the first diffraction grating member may be set to a value between a minimum inclination angle and a maximum inclination angle in another one of the diffracting grating layers, or a maximum inclination angle in the at least one of the diffraction grating layers may be set to a value between the minimum inclination angle and the maximum inclination angle in the another one of the diffracting grating layers.

As a further alternative, when the center of the second diffraction grating member is defined as a point of origin, when a normal line of the second diffraction grating member extending through the point of origin is defined as an X-axis, when an axis line of the light guide plate extending through the point of origin is defined as a Y-axis, when an angle formed by an observation point on the X-axis for observing an image corresponding to the collimated beam group diffracted and reflected by the second diffraction grating member and released from the light guide plate and one of the collimated beams positioned closest to the first diffraction grating member is defined as a field angle $\theta_q = \theta_{q\_0}(>0)$, and when an angle formed by the observation point and another one of the collimated beams positioned farthest from the first diffraction grating member is defined as a field angle $\theta_q = -\theta_{q\_0}(<0)$, the collimated beams being diffracted and reflected by a q-th diffraction grating layer and subsequently by the second diffraction grating member and positioned within an X-Y plane, q being an integer selected from 1 to Q, a collimated beam corresponding to the collimated beam to be given the field angle $\theta_q = \theta_{q\_0}$ may be diffracted and reflected by the q-th diffraction grating layer at a position where the interference fringe having the maximum inclination angle is provided, and a collimated beam corresponding to the collimated beam to be given the field angle $\theta_q = -\theta_{q\_0}$ may be diffracted and reflected by the q-th diffraction grating layer at a position where the interference fringe having the minimum inclination angle is provided.

An optical device according to another embodiment of the present invention includes a light guide plate which receives a collimated beam group including a plurality of collimated beams traveling in different directions, the collimated beam group traveling through the light guide plate while undergoing total reflection therein and then exiting from the light guide plate, a first diffraction grating member including a reflective volume hologram diffraction grating that diffracts and reflects the collimated beam group incident on the light guide plate so as to allow the collimated beam group to undergo total reflection within the light guide plate, and a second diffraction grating member including a reflective volume hologram diffraction grating that diffracts and reflects the collimated beam group transmitted through the light guide plate and directly emits the collimated beam group from the light guide plate. When the first diffraction grating member supposedly includes imaginary diffraction grating layers defined by Q layers of reflective volume hologram diffraction gratings, Q being an integer, each imaginary diffraction grating layer has interference fringes on surfaces thereof, which are arranged at an equal pitch, the interference fringes in the imaginary diffraction grating layers being arranged at the same pitch. When an angle formed between each of the interference fringes in each imaginary diffraction grating layer and each surface of the imaginary diffraction grating layer is defined as an inclination angle, each of the imaginary diffraction grating layers has the following conditions:

(a) each imaginary diffraction grating layer has a minimum inclination angle region having an interference fringe with a minimum inclination angle and an outer region positioned farther away from the second diffraction grating member than the minimum inclination angle region, and the inclination angles of the interference fringes in the outer region increase with increasing distance from the minimum inclination angle region, and (b) each imaginary diffraction grating layer has an inner region positioned closer to the second diffraction grating member than the minimum inclination angle region, and the inclination angles of the interference fringes in the inner region include a maximum inclination angle in an inner area disposed adjacent to the minimum inclination angle region and decrease with increasing distance from the minimum inclination angle region. If the first diffraction grating member is divided into R segments from a section thereof closest to the second diffraction grating member to a section farthest from the second diffraction grating member, R being an integer, an r-th segment $RG_{1\_r}$ of the first diffraction grating member has a multilayer structure that includes corresponding segments $VG_{(r,q)}$ of the Q imaginary diffraction grating layers, the segments $VG_{(r,q)}$ being obtained when each imaginary diffraction grating layer is divided into R segments from a section thereof closest to the second diffraction grating member to a section farthest from the second diffraction grating member, q being a non-redundant arbitrary integer selected from a range of 1 to Q.

An image display apparatus according to another embodiment of the present invention includes an image forming device, a collimator optical unit configured to collimate light beams emitted from the image forming device, and the optical device according to the above-referenced embodiment, which receives the collimated beams collimated and oriented in different directions by the collimator optical unit and then guides and emits the collimated beams.

In the optical device and the image display apparatus according to the above-referenced embodiments, there is a case where each imaginary diffraction grating layer does not have a region that extends farther away from the second diffraction grating member from the minimum inclination angle region having the interference fringe with the minimum inclination angle. In that case, the condition (a) is disregarded. In contrast, there is a case where each imaginary diffraction grating layer does not have a region that extends closer towards the second diffraction grating member from the minimum inclination angle region. In that case, the condition (b) is disregarded.

In the optical device and the image display apparatus according to the above-referenced embodiments, there is a case where the regions and the segments in the first diffraction grating member correspond to each other in a one-to-one fashion, and there also a case where they do not correspond to each other in a one-to-one fashion. This will be described below in detail in the description of the preferred embodiments. Furthermore, the first diffraction grating member may substantially include diffraction grating layers defined by Q layers of reflective volume hologram diffraction gratings, Q being an integer.

In the optical device and the image display apparatus according to the above-referenced embodiments, the interference fringes in each imaginary diffraction grating layer preferably include P kinds of interference fringes so as to set substantially the same angle for diffraction and reflection of P kinds of light beams having different wavelength ranges and defining the collimated beams, P being an integer. Accordingly, this structure contributes to an increase in diffraction efficiency, an increase in acceptable angle for diffraction, and optimization of diffraction angles when the collimated beams having different wavelength ranges (or wavelengths) are diffracted and reflected by the first diffraction grating member. The P types of interference fringes that diffract and reflect collimated beams of certain incident angles have the same inclination angle regardless of the wavelength ranges (or wavelengths) of the collimated beams.

In the above-referenced embodiments of the present invention, when the center of the second diffraction grating member is defined as a point of origin, when a normal line of the second diffraction grating member extending through the point of origin is defined as an X-axis, when an axis line of the light guide plate extending through the point of origin is defined as a Y-axis, when an angle formed by an observation point on the X-axis for observing an image corresponding to the collimated beam group diffracted and reflected by the second diffraction grating member and released from the light guide plate and one of assumed collimated beams positioned closest to the first diffraction grating member is defined as a field angle $\theta_q = \theta_{q\_0}$ (>0), and when an angle formed by the observation point and another one of the assumed collimated beams positioned farthest from the first diffraction grating member is defined as a field angle $\theta_q = -\theta_{q\_0}$ (<0), the assumed collimated beams being assumedly diffracted and reflected by a q-th diffraction grating layer and subsequently by the second diffraction grating member and positioned within an X-Y plane, q being an integer selected from 1 to Q, an assumed collimated beam corresponding to the assumed collimated beam to be given the field angle $\theta_q = \theta_{q\_0}$ may be diffracted and reflected by the q-th diffraction grating layer at a position where the interference fringe having the maximum inclination angle is provided, and an assumed collimated beam corresponding to the assumed collimated beam to be given the field angle $\theta_q = -\theta_{q\_0}$ may be diffracted and reflected by the q-th diffraction grating layer at a position where the interference fringe having the minimum inclination angle is provided.

Furthermore, in all of the above-referenced embodiments of the present invention, the number of times the collimated beam group undergoes total reflection within the light guide plate may vary depending on an incident angle of the collimated beam group on the light guide plate. Accordingly, this contributes to a reduction in length of the first diffraction grating member in the axial direction of the light guide plate, a thickness reduction of the light guide plate, and an increased range of incident angles for collimated beams that can be diffracted and reflected by the first diffraction grating member.

In all of the above-referenced embodiments of the present invention, the collimated beam group including the collimated beams oriented in different directions has to enter the light guide plate. The reason that the light beams have to be collimated is based on the fact that wavefront information obtained when the light beams enter the light guide plate has to be kept even after the light beams exit from the light guide plate via the first diffraction grating member and the second diffraction grating member. In detail, in order to produce the collimated beam group including the plurality of collimated beams oriented in different directions, the image forming device may be disposed at a position corresponding to a focal distance of the collimator optical unit. The collimator optical unit has a function for converting positional information of pixels corresponding to light beams emitted from the image forming device to angular information in the optical system of the optical device.

In all of the above-referenced embodiments of the present invention, the light guide plate has two parallel surfaces (which will be referred to as a first surface and a second surface hereinafter) that extend parallel to an axis line of the light guide plate. If the surface of the light guide plate that the collimated beam group enters is an incidence surface and the surface of the light guide plate from which the collimated beam group exits is an exit surface, both the incidence surface and the exit surface may be defined by the first surface, or the incidence surface may be defined by the first surface and the exit surface may be defined by the second surface. In the former case, the first diffraction grating member and the second diffraction grating member are disposed on the second surface. In the latter case, the first diffraction grating member is disposed on the second surface, and the second diffraction grating member is disposed on the first surface. The light guide plate may be composed of, for example, a glass material including optical glass such as quartz glass and BK7, or a plastic material such as PMMA, polycarbonate resin, acrylic resin, amorphous polypropylene resin, and styrene resin including AS resin.

The material and the basic structure of the first diffraction grating member and the second diffraction grating member formed of reflective volume hologram diffraction gratings may be the same as those of the reflective volume hologram diffraction gratings in related art. The term "reflective volume hologram diffraction grating" refers to a hologram diffraction grating that diffracts and reflects only +1 order diffraction light.

The first diffraction grating member is provided with interference fringes extending from therewithin towards its surfaces. A formation method for the interference fringes may be the same as the formation method in related art. In detail, for example, the first diffraction grating member is irradiated with object light from a first predetermined direction and is simultaneously irradiated with reference light from a second predetermined direction. The object light and the reference light form interference fringes which are recorded within the first diffraction grating member. By properly selecting the first predetermined direction, the second predetermined direction, and appropriate wavelengths for the object light and the reference light, the interference fringes in the surfaces of the first diffraction grating member can be arranged at a desired pitch with desired inclination angles. As mentioned above, the interference fringes are given various inclination angles in accordance with different regions of the first diffraction grating member.

In each of the above-referenced embodiments, the first diffraction grating member may be include diffraction grating layers defined by Q layers of reflective volume hologram diffraction gratings. The multilayer structure of the diffraction grating layers may be made by forming the Q diffraction grating layers individually, and then stacking (adhering) the Q diffraction grating layers on top of each other using, for example, an ultraviolet curable adhesive. Alternatively, the Q diffraction grating layers may be made by forming one diffraction grating layer using a viscous photopolymer material, and sequentially adhering thereon another layer of viscous photopolymer material.

In all of the above-referenced embodiments, the interference fringes in the first diffraction grating member are given various inclination angles. The inclination angles may change in a stepwise manner or in a continuous manner. In the former case, if the first diffraction grating member is divided into S sections from a section closest to the second diffraction grating member to a section farthest from the second diffraction grating member, an inclination angle in an s-th section $RG_{1\_s}$ of the first diffraction grating member (s=1, 2, ..., S) may be fixed, and an inclination angle in a section $RG_{1\_s}$ of the first diffraction grating member may be set differently when the s-value is different. On the other hand, in the latter case, the inclination angles of the interference fringes may increase gradually. Such a continuous change in the inclination angles can be attained by giving object light and/or reference light an appropriate wavefront using a prism or a lens and then exposing a reflective volume hologram diffraction grating to the object light and/or reference light.

On the other hand, the interference fringes provided in the second diffraction grating member may be given a fixed inclination angle or various inclination angles. In the latter case, the inclination angles preferably increase towards the first diffraction grating member. This contributes to further reduction in unevenness in color and luminance. The inclination angles may increase in a stepwise or continuous manner. In other words, in the former case, if the second diffraction grating member is divided into T sections from a section closest to the first diffraction grating member to a section farthest from the first diffraction grating member, the inclination angle in a t-th section $RG_{2\_t}$ of the second diffraction grating member (t=1, 2, ..., T) may be fixed, and moreover, the inclination angles in the sections $RG_{2\_t}$ of the second diffraction grating member may increase as the t value increases. On the other hand, in the latter case, the inclination angles of the interference fringes may change gradually.

The following are examples of the image forming device included in the image display apparatus according to the above-referenced embodiments. One example is an image forming device including a light emitting element, such as an organic EL (electro luminescence) element, an inorganic EL element, and a light emitting diode (LED). Another example is an image forming device having a combination of a light source, such as an LED, and a light valve. The light valve may be, for example, a digital micromirror device (DMD) or a liquid crystal display device such as LCOS (liquid crystal on silicon). Another example is an image forming device having a combination of a light source and a scanning optical system, such as a micro-electro mechanical system (MEMS) and a galvanometer mirror, which scans collimated beams emitted from the light source horizontally and vertically.

The following are specific examples of an image forming device including a light emitting element, and an image forming device including a light emitting element and a light valve. Unless otherwise specified, the number of light emitting elements included in the image forming device may be determined based on the desired specification of the image forming device.

(1) Image Forming Device A

An image forming device A is a color display type that includes a first image forming unit including a first light-emitting-element panel in which first light emitting elements that emit blue light are arranged in a two-dimensional matrix, a second image forming unit including a second light-emitting-element panel in which second light emitting elements that emit green light are arranged in a two-dimensional matrix, a third image forming unit including a third light-emitting-element panel in which third light emitting elements that emit red light are arranged in a two-dimensional matrix, and a combining unit configured to combine the light emitted from the first image forming unit, the second image forming unit, and the third image forming unit on a single optical path. The combining unit may be, for example, a dichroic prism, which may be used similarly in the examples described below. The image forming device A controls the first light emitting elements, the second light emitting elements, and the third light emitting elements between light-emitting and non-light-emitting modes.

(2) Image forming device B

An image forming device B is a color display type that includes a first image forming unit including a first light emitting element emitting blue light and a first light transmission controller (which is a type of a light valve, such as a liquid crystal display device, a digital micromirror device (DMD), and LCOS (liquid crystal on silicon), which may be used similarly in the examples described below) that is configured to control transmission/non-transmission of the blue light emitted from the first light emitting element, a second image forming unit including a second light emitting element emitting green light and a second light transmission controller (light valve) configured to control transmission/non-transmission of the green light emitted from the second light emitting element, a third image forming unit including a third light emitting element emitting red light and a third light transmission controller (light valve) configured to control transmission/non-transmission of the red light emitted from the third light emitting element, and a combining unit configured to combine the light transmitted through the first light transmission controller, the second light transmission controller, and the third light transmission controller on a single optical path. An image is displayed by controlling the transmission/non-transmission of the light emitted from the light emitting elements using the light transmission controllers. As a guide unit configured to guide the light emitted from the first light emitting element, the second light emitting element, and the third light emitting element towards the corresponding light transmission controllers, a light guide member, a microlens array, a mirror, a reflective plate, or a condenser lens, for example, may be used.

(3) Image Forming Device C

An image forming device C is a color display type that includes a first image forming unit including a first light-emitting-element panel in which first light emitting elements that emit blue light are arranged in a two-dimensional matrix and a blue light transmission controller (light valve) configured to control transmission/non-transmission of the blue light emitted from the first light-emitting-element panel, a second image forming unit including a second light-emitting-element panel in which second light emitting elements that emit green light are arranged in a two-dimensional matrix and a green light transmission controller (light valve) configured to control transmission/non-transmission of the green light emitted from the second light-emitting-element panel, a third image forming unit including a third light-emitting-element panel in which third light emitting elements that emit red light are arranged in a two-dimensional matrix and a red light transmission controller (light valve) configured to control transmission/non-transmission of the red light emitted from the third light-emitting-element panel, and a combining unit configured to combine the light transmitted through the blue light transmission controller, the green light transmission controller, and the red light transmission controller on a single optical path. An image is displayed by controlling the transmission/non-transmission of the light emitted from the first light-emitting-element panel, the second light-emitting-element panel, and the third light-emitting-element panel using the light transmission controllers (light valves).

(4) Image Forming Device D

An image forming device D is a field sequential color display type that includes a first image forming unit provided with a first light emitting element emitting blue light, a second image forming unit provided with a second light emitting element emitting green light, a third image forming unit provided with a third light emitting element emitting red light, a combining unit configured to combine the light emitted from the first image forming unit, the second image forming unit, and the third image forming unit on a single optical path, and a light transmission controller (light valve) configured to control transmission/non-transmission of the combined light emitted from the combining unit. An image is displayed by controlling the transmission/non-transmission of the light emitted from the light emitting elements using the light transmission controller.

(5) Image Forming Device E

An image forming device E is a field sequential color display type that includes a first image forming unit including a first light-emitting-element panel in which first light emitting elements that emit blue light are arranged in a two-dimensional matrix, a second image forming unit including a second light-emitting-element panel in which second light emitting elements that emit green light are arranged in a two-dimensional matrix, a third image forming unit including a third light-emitting-element panel in which third light emitting elements that emit red light are arranged in a two-dimensional matrix, a combining unit configured to combine the light emitted from the first image forming unit, the second image forming unit, and the third image forming unit on a single optical path, and a light transmission controller (light valve) configured to control transmission/non-transmission of the combined light emitted from the combining unit. An image is displayed by controlling the transmission/non-transmission of the light emitted from the light-emitting-element panels using the light transmission controller.

(6) Image Forming Device F

An image forming device F is a passive-matrix or active-matrix color display type that displays an image by controlling transmission/non-transmission modes for a first light emitting element, a second light emitting element, and a third light emitting element.

(7) Image Forming Device G

An image forming device G is a field sequential color display type that includes a light transmission controller (light valve) configured to control transmission/non-transmission of light emitted from light emitting units arranged in a two-dimensional matrix. The device controls transmission/non-transmission modes of a first light emitting element, a second light emitting element, and a third light emitting element included in the light emitting units in a time-shared manner and displays an image by controlling the transmission/non-transmission of light emitted from the first light emitting element, the second light emitting element, and the third light emitting element using the light transmission controller.

The collimator optical unit included in the image display apparatus according to the above-referenced embodiments of the present invention is an optical unit that has a positive optical power, and may be defined by a convex lens, a concave lens, a free-form-surface prism, a hologram lens, or a combination of these optical elements.

The optical device according to the above-referenced embodiments may be incorporated in, for example, a head mounted display (HMD). Moreover, the image display apparatus according to the above-referenced embodiments may be, for example, an HMD. This facilitates a lightweight and compact structure and less trouble for installation, and also contributes to lower manufacturing costs.

A plurality of collimated beams emitted from the image forming device and transmitted through the collimator optical unit has various incident angles with respect to the first diffraction grating member depending on emission positions from the image forming device. In a first diffraction grating member having interference fringes with a fixed inclination angle, a diffraction wavelength that satisfies a Bragg condition is different in each region of the first diffraction grating member. In the above-referenced embodiments of the present invention, the interference fringes in the first diffraction grating member are given various inclination angles so that even if the collimated beams enter the first diffraction grating member at different incident angles, a Bragg condition is satisfied in each region of the first diffraction grating member. Consequently, the diffraction efficiency of a certain wavelength range can be made constant to a maximum extent in each region of the first diffraction grating member. This reduces the possibility of occurrences of uneven coloring and luminance in a pixel image guided to an eye in accordance with pixel positions in the image forming device. In addition, by setting the inclination angle of interference fringes in a predetermined region of the first diffraction grating member to a predetermined value, a collimated beam incident on the first diffraction grating member and diffracted and reflected by the first diffraction grating member can be led properly to a predetermined region of the second diffraction grating member. Furthermore, by giving the first diffraction grating member a multilayer structure that includes Q diffraction grating layers, the length of the first diffraction grating member can be reduced in the axial direction of the light guide plate while achieving a larger field angle.

BRIEF DESCRIPTION OF THE DRAWINGS

FIG. 6 schematically illustrates a state where angular characteristics for diffraction efficiency in a region of the first diffraction grating member overlap;

DESCRIPTION OF THE PREFERRED EMBODIMENTS

Preferred embodiments of the present invention will now be described with reference to the drawings.

First Embodiment

Figure 1:
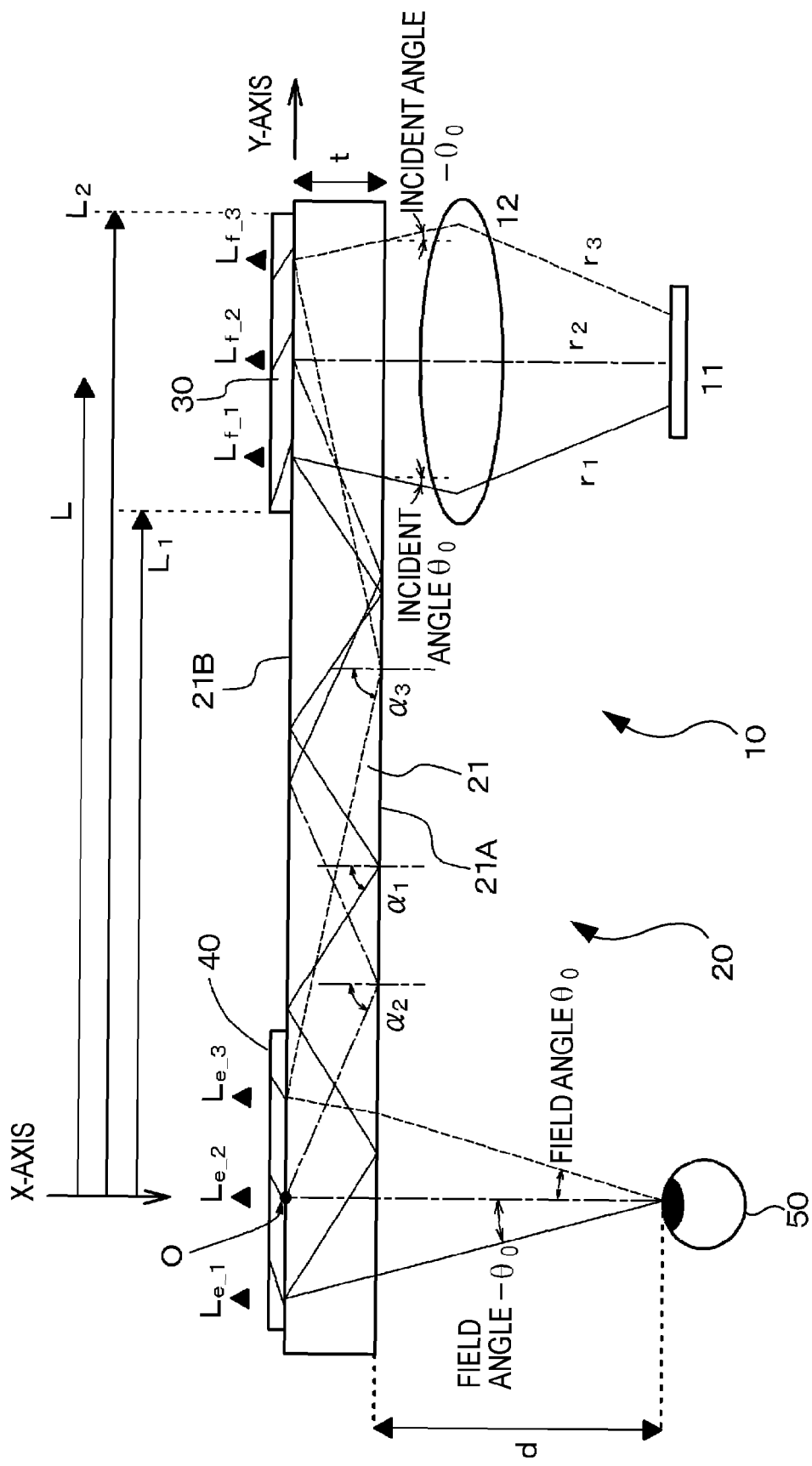
FIG. 1 schematically illustrates an optical device and an image display apparatus according to a first embodiment of the present invention.

A first embodiment of the present invention relates to an optical device and an image display apparatus. FIG. 1 schematically illustrates an optical device 20 and an image display apparatus 10 according to the first embodiment of the present invention.

The image display apparatus 10 according to the first embodiment includes an image forming device 11, a collimator optical unit 12 configured to collimate light beams emitted from the image forming device 11, and the optical device 20 which receives the plurality of collimated beams collimated and oriented in different directions by the collimator optical unit 12, and then guides and emits the collimated beams. The image forming device 11 is, for example, a liquid-crystal display device (LCD). The collimator optical unit 12 is, for example, a convex lens. In order to produce a collimated beam group that includes the plurality of collimated beams traveling in different directions, the image forming device 11 is disposed at a position corresponding to a focal distance of the collimator optical unit 12.

The optical device 20 according to the first embodiment includes a light guide plate 21, a first diffraction grating member 30, and a second diffraction grating member 40. Specifically, the collimated beam group including the plurality of collimated beams traveling in different directions enters the light guide plate 21, travels through the light guide plate 21 while undergoing total reflection therein, and exits from the light guide plate 21. The first diffraction grating member 30 includes a reflective volume hologram diffraction grating that diffracts and reflects the collimated beam group incident on the light guide plate 21 so as to allow the collimated beam group to undergo total reflection within the light guide plate 21. The second diffraction grating member 40 includes a reflective volume hologram diffraction grating which diffracts and reflects the collimated beam group traveling through the light guide plate 21 while undergoing total reflection therein, and which directly emits the collimated beam group from the light guide plate 21.

Figure 2A:
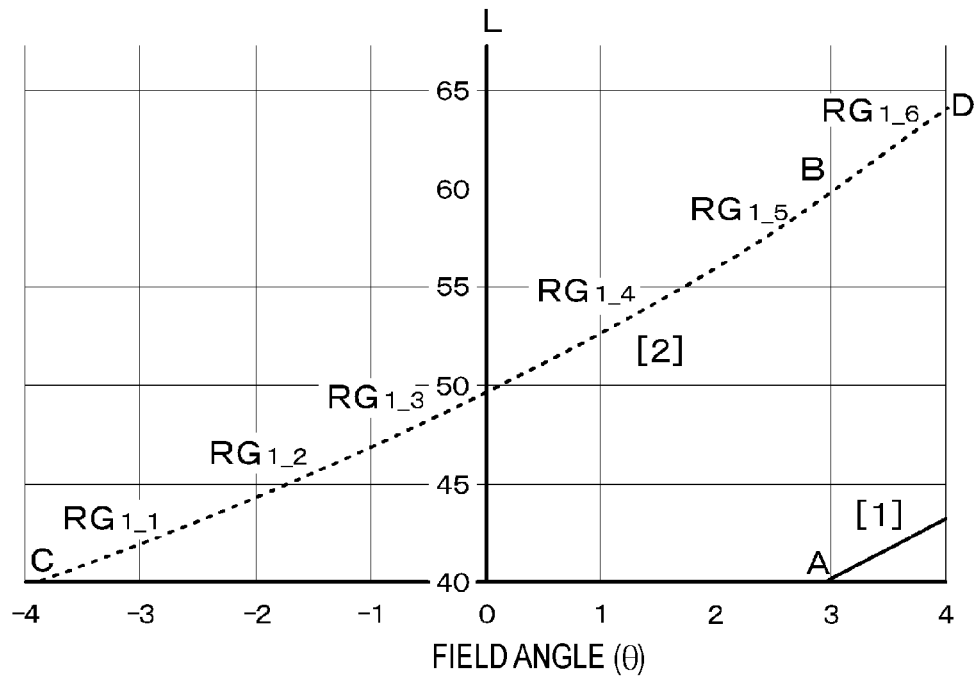
FIG. 2A is a graph that shows a relationship between the number of times a collimated beam undergoes total reflection in a light guide plate, a field angle $\theta$, and an incident position of a collimated beam on a first diffraction grating member in the first embodiment.
Figure 2B:
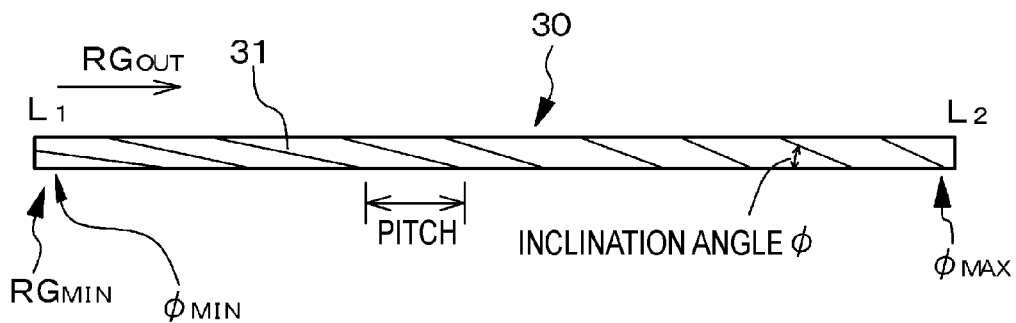
FIGS. 2B and 2C are schematic cross-sectional views of the first diffraction grating member according to the first embodiment.

Referring to a schematic cross-sectional view of FIG. 2B, the first diffraction grating member 30 has interference fringes 31 extending from within the first diffraction grating member 30 towards surfaces thereof. The interference fringes 31 on the surfaces of the first diffraction grating member 30 are arranged at an equal pitch.

Figure 2C:
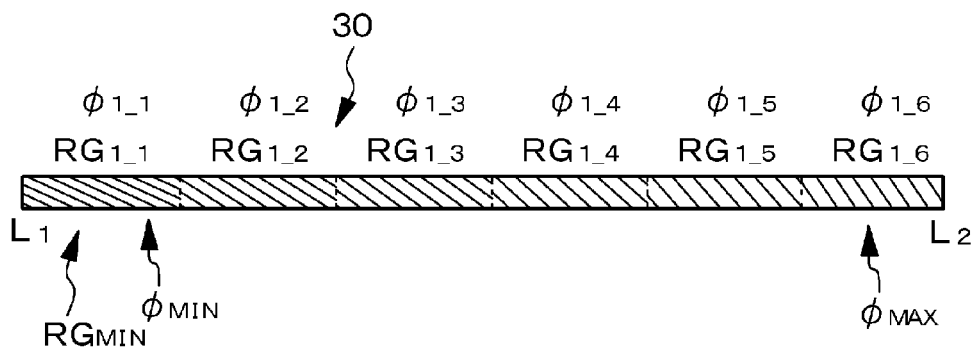

Referring to FIG. 2B or a schematic cross-sectional view of FIG. 2C (see also FIG. 3B of second embodiment), when an angle formed between each of the interference fringes 31 in the first diffraction grating member 30 and one of the surfaces of the first diffraction grating member 30 is defined as an inclination angle φ, the first diffraction grating member 30 may have the following conditions:

(a) the first diffraction grating member 30 has a minimum inclination angle region $RG_{MIN}$ having an interference fringe 31 with a minimum inclination angle $\phi_{MIN}$ and an outer region $RG_{OUT}$ positioned farther away from the second diffraction grating member 40 than the minimum inclination angle region $RG_{MIN}$, and the inclination angles φ of the interference fringes 31 in the outer region $RG_{OUT}$ increase with increasing distance from the minimum inclination angle region $RG_{MIN}$, and (b) the first diffraction grating member 30 has an inner region $RG_{IN}$ positioned closer to the second diffraction grating member 40 than the minimum inclination angle region $RG_{MIN}$, and the inclination angles α of the interference fringes 31 in the inner region $RG_{IN}$ include a maximum inclination angle $\phi_{MAX}$ in an inner area $RG_{IN-NEAR}$ disposed adjacent to the minimum inclination angle region $RG_{MIN}$ and decrease with increasing distance from the minimum inclination angle region $RG_{MIN}$.

Referring to FIG. 1, the behavior of the collimated beams within the light guide plate 21 will be described below. The term "total reflection" used in the following descriptions, including the descriptions of second to fifth embodiments, refers to total internal reflection or total reflection within the light guide plate.

The center of the second diffraction grating member 40 will be defined as a point of origin O. A normal line of the second diffraction grating member 40 extending through the point of origin O will be defined as an X-axis. An axis line of the light guide plate 21 extending through the point of origin O will be defined as a Y-axis. Furthermore, an eye 50 that observes an image corresponding to the collimated beam group diffracted and reflected by the second diffraction grating member 40 and released from the light guide plate 21 is supposedly present at a point on the X-axis. An X-coordinate value of the eye 50 corresponds to an eye relief d. In order to simplify the description below, collimated beams that are positioned within the X-Y plane will be described below. Moreover, a distance from the point of origin O to an end of the first diffraction grating member 30 proximate to the second diffraction grating member 40 will be referred to as $L_1$, and a distance from the point of origin O to an end of the first diffraction grating member 30 distant from the second diffraction grating member 40 will be referred to as $L_2$.

A light beam $r_1$ (indicated by a solid line), a light beam $r_2$ (indicated by a dot-dash line), and a light beam $r_3$ (indicated by a dotted line) are emitted from the image forming device 11 and are transmitted through the collimator optical unit 12 where the light beams $r_1$ to $r_3$ become collimated beams of an incident angle $+\theta_{IN}$ (>0), an incident angle +0(°), and an incident angle $-\theta_{IN}$ (<0), respectively. Subsequently, the collimated beams enter the light guide plate 21, and then enter the first diffraction grating member 30. The collimated beams are diffracted and reflected by the first diffraction grating member 30 and travel towards the second diffraction grating member 40 while undergoing total reflection within the light guide plate 21. Subsequently, the collimated beams enter the second diffraction grating member 40, and then enter the center of the eye 50 at a field angle θ of $-\theta_0$ (<0), a field angle θ of 0 (°), and a field angle θ of $+\theta_0$ (>0), respectively. Each of the collimated beams incident on the light guide plate 21 at an incident angle θ is released from the light guide plate 21 at a field angle θ (=incident angle [−θ]). In this case, the collimated beams $r_1$, $r_2$, $r_3$ travel through the light guide plate 21 while undergoing total reflection at different total-reflection points and by different number of times based on different total-reflection angles $\alpha_1$, $\alpha_2$, and $\alpha_3$, respectively. The collimated beams undergo total reflection off a first surface 21A of the light guide plate 21 (i.e. a surface opposite to a second surface 21B), and then undergo total reflection off the second surface 21B (i.e. a surface of the light guide plate 21 on which the first diffraction grating member 30 and the second diffraction grating member 40 are disposed). In this case, a relationship between a total-reflection point on the second surface 21B (distance L from the point of origin O) and the number of times N of total reflection is represented by the following expression (1):

$$L = L_f - 2 \times N \times t \times \tan(\alpha) \quad (1)$$

where $L_f$ represents an incident point of each collimated beam on the first diffraction grating member 30 (i.e. distance from the point of origin O), t represents the thickness of the light guide plate 21, and α represents the total-reflection angle of the collimated beam.

Accordingly, the relational expression (1) for each of the collimated beams $r_1$, $r_2$, $r_3$ with the total-reflection angles $\alpha_1$, $\alpha_2$, and $\alpha_3$ is represented by the following expressions (2-1), (2-2), and (2-3), respectively:

$$L_{e\_1} = L_{f\_1} - 2 \times N_1 \times t \times \tan(\alpha_1) \quad (2\text{-}1)$$

$$L_{e\_2} = L_{f\_2} - 2 \times N_2 \times t \times \tan(\alpha_2) \quad (2\text{-}2)$$

$$L_{e\_3} = L_{f\_3} - 2 \times N_3 \times t \times \tan(\alpha_3) \quad (2\text{-}3)$$

where $L_{f\_1}$, $L_{f\_2}$ and $L_{f\_3}$ represent incident points of the corresponding collimated beams on the first diffraction grating member 30 (the incident points being the first internal reflection points and corresponding to the distances from the point of origin O), $L_{e\_1}$, $L_{e\_2}$ and $L_{e\_3}$ represent the incident points of the corresponding collimated beams on the second diffraction grating member 40 (the incident points being the last internal reflection points and corresponding to the distances from the point of origin O), and $N_1$, $N_2$ and $N_3$ each represent the number of times of total reflection.

As is apparent from FIG. 1, each of $L_{e\_1}$, $L_{e\_2}$ and $L_{e\_3}$ is determined uniquely based on the relationship between the field angle θ and the eye relief d, such that each of the collimated beams enters the central portion of the eye 50. Furthermore, $N_1$, $N_2$, and $N_3$ are positive integers. These relational expressions are dependent on various conditions, such as the thickness t of the light guide plate 21, a range between $L_1$ and $L_2$ of the first diffraction grating member 30 that receives the collimated beams, and the total-reflection angles $\alpha_1$, $\alpha_2$, and $\alpha_3$ each determined from the field angle θ and the pitch of the interference fringes 31 in the first diffraction grating member 30. Therefore, these variables are preferably determined in a practical manner.

In conditions shown in Table 1 below, the field angle θ is counted by the degree in a range between −80° and +80°. Table 2 shows calculation results of an inclination distribution of the interference fringes in the second diffraction grating member 40, which satisfies a Bragg condition at the same wavelength at each field angle θ. Generally, an inclination angle $\phi_{Max}$ of an interference fringe at which the diffraction efficiency is at maximum when a collimated beam enters the diffraction grating member at an incident angle $\psi_{IN}$ and is diffracted and reflected by an exit diffraction angle $\psi_{OUT}$ can be represented by the following expression (3):

$$\phi_{MAX} = (\psi_{OUT} + \psi_{IN})/2 \quad (3).$$

This expression (3) can be derived based on the Bragg condition.

The interference fringes of the second diffraction grating member 40 in the first embodiment or in each of second to fifth embodiments to be described below are formed in accordance with inclination angle values shown in Table 2. In detail, the interference fringes of the second diffraction grating member 40 have inclination angles that are larger towards the first diffraction grating member 30. This contributes to further reduction in unevenness in color and luminance. The inclination angles may increase in a stepwise manner or in a continuous manner. Specifically, in a case where the inclination angles increase in a stepwise manner, if the second diffraction grating member 40 is divided into T sections between the farthest position from the first diffraction grating member 30 and the closest position to the first diffraction grating member 30, the inclination angles in a t-th section $RG_{2\_t}$ of the second diffraction grating member 40 (t=1, 2, ..., T) may be fixed, and moreover, the inclination angles in the sections $RG_{2\_t}$ of the second diffraction grating member 40 may increase as the t value increases. On the other hand, if the inclination angles increase in a continuous manner, the inclination angles of the interference fringes may change gradually.

TABLE 1

| Material of Light Guide Plate 21: | Optical Glass (BK7 with Refractive Index 1.52) |
|---|---|
| Thickness t of Light Guide Plate 21: | 2.0 mm |
| Incident Wavelength λ: | 522 nm |
| Pitch of Interference Fringes of Second Diffraction Grating Member 40: | 402.2 nm |
| Total-Reflection Angle of Light Beam within Light guide plate 21 to be released from Light guide plate 21 at 0° Field Angle: | 58.8° | in the first diffraction grating member 30, a field angle $θ_0$, and a field angle $-θ_0$ are set as shown in Table 3 below.

TABLE 3

| Thickness t of Light Guide Plate 21: | 5 mm |
|---|---|
| Eye Relief d: | 20 mm |
| Pitch of Interference Fringes of First Diffraction Grating Member 30: | 402.2 nm |
| Field Angle $θ_0$: | 4.0° |
| Field Angle $-θ_0$: | -4.0° |

In FIG. 2A, an upward-sloping solid curve [1] corresponds to a case where the number of times N of total reflection is 3, and an upward-sloping dotted curve [2] corresponds to a case where the number of times N of total reflection is 4.

The negative direction along the horizontal axis (corresponding to the field angle θ and also to the incident angle [−θ]) of the graph is a direction in which the inclination angles φ of the interference fringes 31 of the first diffraction grating member 30, which satisfy the Bragg condition at the same wavelength, relatively become smaller. In contrast, the positive direction along the horizontal axis (corresponding to field angle θ and also to incident angle [−θ]) of the graph is a direction in which the inclination angles φ of the interference FIG. 31 of the first diffraction grating member 30, which satisfy the Bragg condition at the same wavelength, relatively become larger. Consequently, the fact that the curves shown on the graph increase from left to right implies that the incli-

TABLE 2

| Field Angle θ (in air) | -8.0 | -7.0 | -6.0 | -5.0 | -4.0 | -3.0 | -2.0 | -1.0 | 0.0 | 1.0 | 2.0 | 3.0 | 4.0 | 5.0 | 6.0 | 7.0 | 8.0 |
|---|---|---|---|---|---|---|---|---|---|---|---|---|---|---|---|---|---|
| Field Angle θ (in medium) | -5.3 | -4.6 | -4.0 | -3.3 | -2.6 | -2.0 | -1.3 | -0.7 | 0.0 | 0.7 | 1.3 | 2.0 | 2.6 | 3.3 | 4.0 | 4.6 | 5.3 |
| Total-Reflection Angle (within light guide plate) | 49.8 | 50.8 | 51.9 | 52.9 | 54.0 | 55.2 | 56.3 | 57.5 | 58.8 | 60.1 | 61.4 | 62.9 | 64.3 | 65.9 | 67.6 | 69.3 | 71.3 |
| Inclination Angle φ of Interference Fringe | 27.5 | 27.7 | 27.9 | 28.1 | 28.3 | 28.6 | 28.8 | 29.1 | 29.4 | 29.7 | 30.1 | 30.4 | 30.9 | 31.3 | 31.8 | 32.4 | 33.0 |
| Exit Position from Second Diffraction Grating Member | -3.0 | -2.6 | -2.2 | -1.9 | -1.5 | -1.1 | -0.7 | -0.4 | 0.0 | 0.4 | 0.7 | 1.1 | 1.5 | 1.9 | 2.2 | 2.6 | 3.0 |

As is apparent from Table 2, the inclination angles in the second diffraction grating member 40 become greater as the field angle θ increases. In other words, the smaller the value of the field angle θ, the smaller the value of the total-reflection angle α, such that the number of times N a collimated beam corresponding to such a field angle θ undergoes total reflection within the light guide plate 21 increases. In contrast, the greater the value of the field angle θ, the greater the total-reflection angle α, such that the number of times N a collimated beam corresponding to such a field angle θ undergoes total reflection within the light guide plate 21 decreases.

FIG. 2A is a graph that shows at which point in the first diffraction grating member 30 a collimated beam with a wavelength λ of 522 nm is diffracted and reflected before entering the center of the eye 50, and also shows the number of times the collimated beam undergoes total reflection off the second surface 21B of the light guide plate 21 before reaching the eye 50. This graph and equivalent graphs of embodiments that follow are all calculated on the basis of the expression (1). Furthermore, the vertical axis in each of the graphs represents the distance L, and the horizontal axis represents the field angle θ.

In the first embodiment, the thickness t of the light guide plate 21, the eye relief d, the pitch of the interference fringes nation angles φ of the interference fringes 31 of the first diffraction grating member 30, which diffracts and reflects collimated beams at the same wavelength, increase as the field angle θ changes in the positive direction. Moreover, this also implies that the distance from the point of origin O to the region of the first diffraction grating member 30 provided with these inclination angles increases gradually.

More specifically, referring to FIG. 2A, for example, a collimated beam corresponding to a field angle θ of 30° (=incident angle [−θ]) enters the first diffraction grating member 30 at point A (L≈40 mm) thereof and is diffracted and reflected within this region of the first diffraction grating member 30. The collimated beam undergoes total reflection three times off the second surface 21B of the light guide plate 21 and then enters the second diffraction grating member 40 where the beam is diffracted and reflected. Subsequently, the beam is released from the light guide plate 21 and is guided to the eye 50. In addition, the collimated beam corresponding to a field angle θ of 30°(= incident angle [−θ]) also enters the first diffraction grating member 30 at point B (L≈60 mm) and is diffracted and reflected within this region of the first diffraction grating member 30. The collimated beam undergoes total reflection four times off the second surface 21B of the light guide plate 21 and then enters the second diffraction grating member 40 where the beam is diffracted and reflected.

Subsequently, the beam is released from the light guide plate 21 and is guided to the eye 50. Accordingly, in the first diffraction grating member 30, the inclination angle φ of the interference fringe 31 within a region of point B (L≈60 mm) may be set to 30.4° with respect to the field angle θ of 3° (=incident angle [−θ]) (see Table 2). Thus, the number of times the collimated beam group undergoes total reflection within the light guide plate 21 varies depending on the incident angle of the collimated beam group on the light guide plate 21.

Similarly, Table 4 below shows the relationship between the distance L, the field angle θ, and the inclination angle φ.

TABLE 4

| Distance L (mm) | Field Angle θ (°) | Inclination Angle φ (°) |
| --- | --- | --- |
| 40 | −3.87 | 28.37 |
| 45 | −1.67 | 28.92 |
| 50 | 0.23 | 29.47 |
| 55 | 1.74 | 29.97 |
| 60 | 3.03 | 30.45 |
| 65 | 4.17 | 30.93 |

In the example shown in FIG. 2A, an inclination angle φ corresponding to a field angle θ is determined based on the dotted curve [2] (in which the number of times N of total reflection is 4). Each of the interference fringes 31 having the determined inclination angles φ is provided in a region of the first diffraction grating member 30 corresponding to the distance L. FIG. 2B is a schematic cross-sectional view of the first diffraction grating member 30 in which the inclination angles φ of such interference fringes 31 increase continuously and monotonously in accordance with the increase of distance L.

Alternatively, the inclination angles φ may change in a stepwise manner. Specifically, FIG. 2C is a schematic cross-sectional view of the first diffraction grating member 30 in which the first diffraction grating member 30 is divided into S sections (S=6) in the axial direction of the light guide plate 21. In this case, an inclination angle $\phi_{1\_s}$ in an s-th section $RG_{1\_s}$ of the first diffraction grating member 30 (s=1, 2, ..., 6) may be fixed, and an inclination angle $\phi_{1\_s}$ in a section $RG_{1\_s}$ of the first diffraction grating member 30 is set differently when the s-value is different. Table 5 below shows the relationship between a range of distance $L_{1\_s}$ of each section $RG_{1\_s}$, a field angle $\theta_{1\_s}$ (=incident angle $[-\theta]_{1\_s}$), and an inclination angle $\phi_{1\_s}$.

TABLE 5

| s | Distance $L_{1\_s}$ (mm) | Field Angle $\theta_{1\_s}$ (°) | Incl. Angle $\phi_{1\_s}$ (°) |
| --- | --- | --- | --- |
| 1 | 40.0 to 43.0 | −3.2 | 28.53 |
| 2 | 43.0 to 46.5 | −1.9 | 28.86 |
| 3 | 46.5 to 50.4 | −0.38 | 29.29 |
| 4 | 50.4 to 55.0 | 0.90 | 29.69 |
| 5 | 55.0 to 60.1 | 2.5 | 30.25 |
| 6 | 60.1 to 65.0 | 3.64 | 30.70 |

When an angle formed between each of the interference fringes 31 in the first diffraction grating member 30 and one of the surfaces of the first diffraction grating member 30 is defined as an inclination angle φ, in the example of the first diffraction grating member 30 shown in FIG. 2B, the interference fringes 31 provided in the outer region $RG_{OUT}$, which is positioned farther away from the second diffraction grating member 40 than the minimum inclination angle region RGMIN (corresponding to point C, L=4 mm) having an interference fringe 31 with a minimum inclination angle $\phi_{MIN}$ (corresponding to field angle θ=incident angle [−θ]=−4.0°), have inclination angles φ that increase with increasing distance from the minimum inclination angle region $RG_{MIN}$. In this case, since the first diffraction grating member 30 does not have a region that extends closer towards the second diffraction grating member 40 from the minimum inclination angle region $RG_{MIN}$, the aforementioned condition (b) is disregarded.

Furthermore, of the collimated beams diffracted and reflected by the second diffraction grating member 40 and positioned within the X-Y plane, when an angle formed between the second diffraction grating member 40 and the collimated beam that is closest to the first diffraction grating member 30 is defined as a field angle θ=θ₀ (>0) and an angle formed between the second diffraction grating member 40 and the collimated beam that is farthest from the first diffraction grating member 30 is defined as a field angle θ=−θ₀ (<0), a region of the first diffraction grating member 30 (corresponding to point D, L=65 mm), in which a collimated beam corresponding to the collimated beam to be given the field angle θ=θ₀ is diffracted and reflected, has an interference fringe with a maximum inclination angle (corresponding to field angle θ=incident angle [−θ]=−4.0°), and a region of the first diffraction grating member 30 (corresponding to point C, L=40 mm), in which a collimated beam corresponding to the collimated beam to be given the field angle θ=−θ₀ is diffracted and reflected, has an interference fringe with a minimum inclination angle (corresponding to field angle θ= incident angle [−θ]=−4.0°).

Second Embodiment

A second embodiment is a modification of the first embodiment. In the second embodiment, the various parameters shown in Table 3 of the first embodiment are changed to parameters shown in Table 6 below.

TABLE 6

| | |
| --- | --- |
| Thickness t of Light Guide Plate 21: | 6 mm |
| Eye Relief d: | 20 mm |
| Pitch of Interference Fringes of First Diffraction Grating Member 30: | 402.2 nm |
| Field Angle θ₀: | 3.5° |
| Field Angle −θ₀: | −3.5° |

Figure 3A:
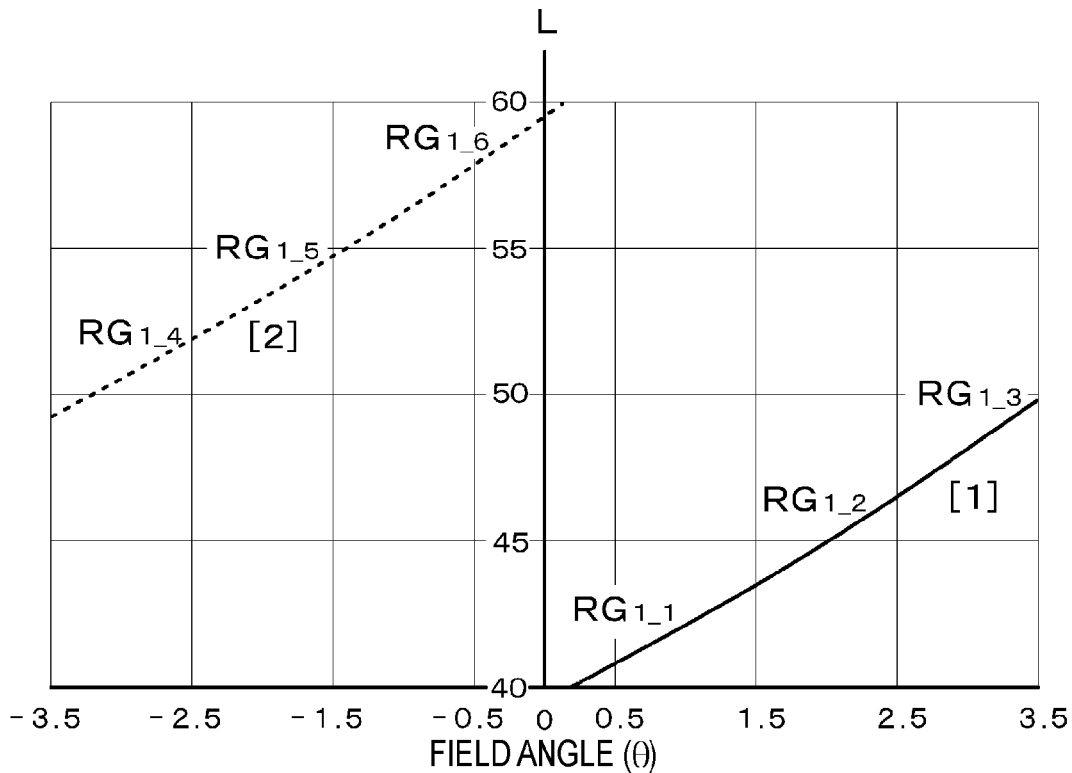
FIG. 3A is a graph that shows a relationship between the number of times a collimated beam undergoes total reflection in a light guide plate, a field angle θ, and an incident position of a collimated beam on a first diffraction grating member in a second embodiment.
Figure 3B:
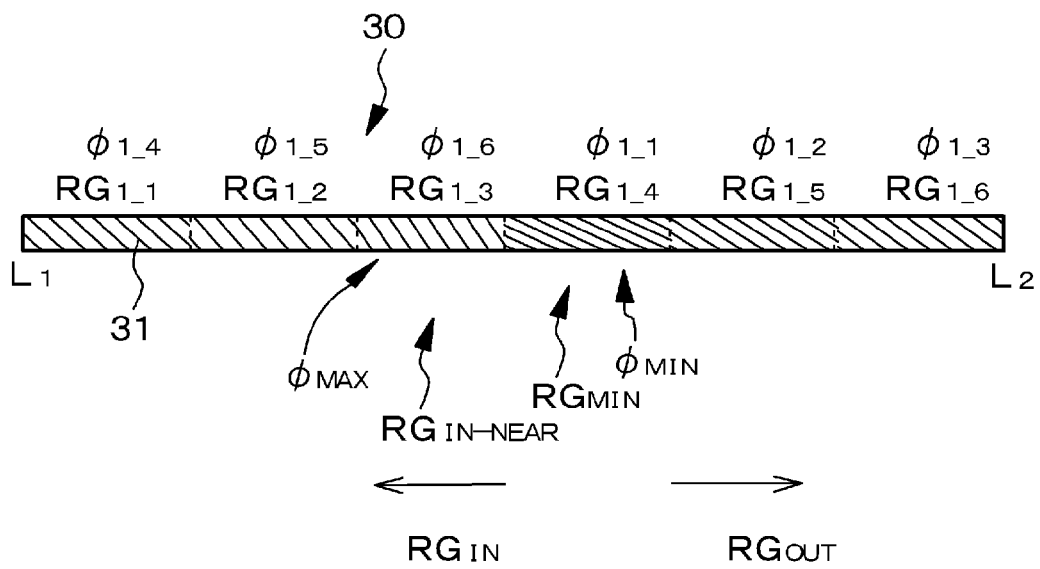
FIG. 3B is a schematic cross-sectional view of the first diffraction grating member according to the second embodiment.

FIG. 3A is a graph that shows at which point in the first diffraction grating member 30 a collimated beam with a wavelength λ of 522 nm is diffracted and reflected before entering the center of the eye 50, and also shows the number of times the collimated beam undergoes total reflection off the second surface 21B of the light guide plate 21 before reaching the eye 50.

In FIG. 3A, an upward-sloping solid curve [1] corresponds to a case where the number of times N of total reflection is 3, and an upward-sloping dotted curve [2] corresponds to a case where the number of times N of total reflection is 4. As described in the first embodiment, the fact that the curves shown on the graph increase from left to right implies that the inclination angles φ of the interference fringes 31 of the first diffraction grating member 30, which diffracts and reflects collimated beams at the same wavelength, increase as the field angle θ changes in the positive direction. Moreover, this also implies that the distance from the point of origin O to the region of the first diffraction grating member 30 provided with these inclination angles increases gradually.

For example, a collimated beam corresponding to a field angle θ within a range of 0.20 to 3.50 (=incident angle [−θ]) enters the first diffraction grating member 30 within a region of L≈40 to 50 mm and is diffracted and reflected within this region of the first diffraction grating member 30. The collimated beam undergoes total reflection three times off the second surface 21B of the light guide plate 21 and then enters the second diffraction grating member 40 where the beam is diffracted and reflected. Subsequently, the beam is released from the light guide plate 21 and is guided to the eye 50. In this case, the inclination angles φ of the interference fringes 31 of the first diffraction grating member 30, which diffracts and reflects collimated beams at the same wavelength, increase as the field angle θ changes in the positive direction, and the distance from the point of origin O to the region of the first diffraction grating member 30 provided with these inclination angles increases gradually.

On the other hand, if the field angle θ is 0.2° or less, a collimated beam corresponding to a field angle θ within a range of −3.5° to 0.2° (=incident angle [−θ]) enters the first diffraction grating member 30 within a region of L≈49 to 60 mm and is diffracted and reflected within this region of the first diffraction grating member 30. The collimated beam undergoes total reflection four times off the second surface 21B of the light guide plate 21 and then enters the second diffraction grating member 40 where the beam is diffracted and reflected. Subsequently, the beam is released from the light guide plate 21 and is guided to the eye 50. Similarly, in this case, the inclination angles φ of the interference fringes 31 of the first diffraction grating member 30, which diffracts and reflects collimated beams at the same wavelength, increase as the field angle θ changes in the positive direction, and the distance from the point of origin O to the region of the first diffraction grating member 30 provided with these inclination angles increases gradually.

Table 7 below shows the relationship between the distance L, the field angle θ, and the inclination angle φ.

TABLE 7

| Distance L (mm) | Field Angle θ (°) | Inclination Angle φ (°) |
| --- | --- | --- |
| 40 | 0.3 | 29.49 |
| 45 | 2.05 | 30.08 |
| 50 | −3.2 | 28.53 |
| 55 | −1.37 | 29.00 |
| 60 | 0.15 | 29.45 |

A region of L≈49 mm in the first diffraction grating member 30, which is where a collimated beam corresponding to field angle θ=−θ₀=−3.5° enters, has an interference fring with a minimum inclination angle $\phi_{MIN}$. In the outer region $RG_{OUT}$ (i.e. a region up to L=60 mm) of the first diffraction grating member 30, which is positioned farther away from the second diffraction grating member 40 than the minmum inclination angle region $RG_{MIN}$ (corresponding to L≈49 mm having the interference fringe 31 with the minimum inclination angle $\phi_{MIN}$ the inclination angles φ of the interference fringes 31 increase with increasing distance from the minimum inclination angle region $RG_{MIN}$ (corresponding to L≈49 mm).

On the other hand, in the inner region $RG_{IN}$ of the first diffraction grating member 30, which is positioned closer to the second diffraction grating member 40 than the minimum inclination angle region $RG_{MIN}$ (corresponding to L≈49 mm), the interference fringes 31 have inclination angles φ that decrease with increasing distance from the minimum inclination angle region $RG_{MIN}$ and include an interference fringe 31 with a maximum inclination angle $\phi_{MAX}$ in the inner area $RG_{IN\text{-}NEAR}$ disposed adjacent to the minimum inclination angle region $RG_{MIN}$.

The inclination angles φ in the outer region $RG_{OUT}$ may increase continuously and monotonously in accordance with the increase of distance L, and the inclination angles φ in the inner region $RG_{IN}$ may similarly increase continuously and monotonously in accordance with the increase of distance L. Alternatively, as shown in the schematic cross-sectional view of the first diffraction grating member 30 in FIG. 3B, the inclination angles φ in the outer region $RG_{OUT}$ may increase in a stepwise and monotonous manner in accordance with the increase of distance L, and the inclination angles φ in the inner region $RG_{IN}$ may similarly increase in a stepwise and monotonous manner in accordance with the increase of distance L. In other words, the first diffraction grating member 30 may be divided into S sections (S=6) in the axial direction of the light guide plate 21. In this case, an inclination angle $\phi_{1\_s}$ in an s-th section $RG_{1\_s}$ of the first diffraction grating member 30 (s=1, 2, . . . , 6) may be fixed, and an inclination angle $\phi_{1\_s}$ in a section $RG_{1\_s}$ of the first diffraction grating member 30 may be set differently when the s-value is different. Table 8 below shows the relationship between a range of distance $L_{1\_s}$ of each section $RG_{1\_s}$, a field angle $\theta_{1\_s}$ (=incident angle $[-\theta]_{1\_s}$), and an inclination angle $\phi_{1\_s}$

TABLE 8

| s | Distance $L_{1\_s}$ (mm) | Field Angle $\theta_{1\_s}$ (°) | Incl. Angle $\phi_{1\_s}$ (°) |
| --- | --- | --- | --- |
| 1 | 40.0 to 43.3 | 0.83 | 29.66 |
| 2 | 43.3 to 46.6 | 2.05 | 28.55 |
| 3 | 46.6 to 49.9 | 3.05 | 31.45 |
| 4 | 49.9 to 53.2 | −2.81 | 28.28 |
| 5 | 53.2 to 56.5 | −1.44 | 28.78 |
| 6 | 56.5 to 59.8 | −0.375 | 29.23 |

In the second embodiment, a collimated beam corresponding to a field angle θ of 0.15° or less undergoes total reflection four times off the second surface 21B of the light guide plate 21, whereas a collimated beam corresponding to a field angle θ of 0.15° or more undergoes total reflection three times off the second surface 21B of the light guide plate 21.

Third Embodiment

A third embodiment is also a modification of the first embodiment. In the third embodiment, the various parameters shown in Table 3 of the first embodiment are changed to parameters shown in Table 9 below.

TABLE 9

| | |
| --- | --- |
| Thickness t of Light Guide Plate 21: | 5 mm |
| Eye Relief d: | 20 mm |
| Pitch of Interference Fringes of First Diffraction Grating Member 30: | 402.2 nm |
| Field Angle $\theta_0$: | 6.0° |
| Field Angle $-\theta_0$: | −6.0° |

In the third embodiment, the first diffraction grating member 30 includes diffraction grating layers 30A, 30B defined by Q layers of reflective volume hologram diffraction gratings (Q=2 in the third embodiment). Each of the diffraction grating layers 30A, 30B included in the first diffraction grating member 30 has interference fringes extending from within the diffraction grating layer 30A, 30B towards surfaces thereof. The interference fringes on the surfaces of each of the diffraction grating layers 30A, 30B of the first diffraction grating member 30 are arranged at an equal pitch. Moreover, the pitch of the interference fringes in the diffraction grating layer 30A is the same as the pitch of the interference fringes in the diffraction grating layer 30B.

The diffraction grating layers 30A, 30B of the first diffraction grating member 30 have different minimum inclination angles $\phi_{MIN}$ and different maximum inclination angles $\phi_{MAX}$ with respect to each other.

Figure 4A:
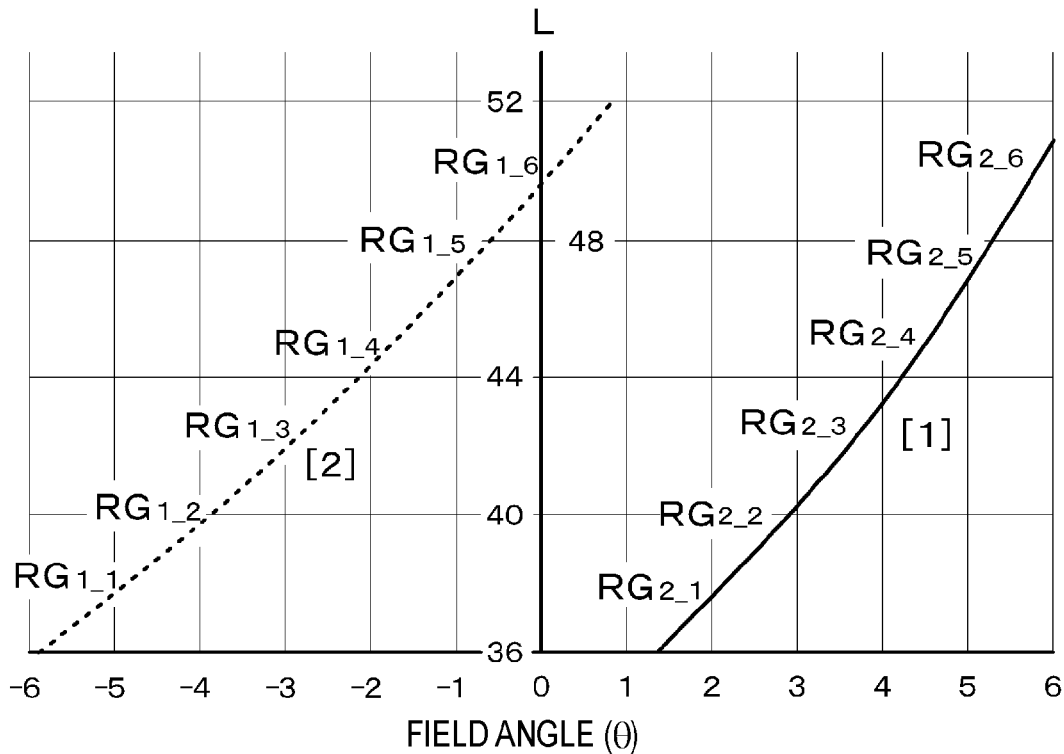
FIG. 4A is a graph that shows a relationship between the number of times a collimated beam undergoes total reflection in a light guide plate, a field angle θ, and an incident position of a collimated beam on a first diffraction grating member in a third embodiment.

FIG. 4A is a graph that shows at which point in the first diffraction grating member 30 a collimated beam with a wavelength $\lambda$ of 522 nm is diffracted and reflected before entering the center of the eye 50, and also shows the number of times the collimated beam undergoes total reflection off the second surface 21B of the light guide plate 21 before reaching the eye 50.

In FIG. 4A, an upward-sloping solid curve [1] corresponds to a case where the number of times N of total reflection is 3, and an upward-sloping dotted curve [2] corresponds to a case where the number of times N of total reflection is 4. As described in the first embodiment, the fact that the curves shown on the graph increase from left to right implies that the inclination angles $\phi$ of the interference fringes 31 of the first diffraction grating member 30, which diffracts and reflects collimated beams at the same wavelength, increase as the field angle $\theta$ changes in the positive direction. Moreover, this also implies that the distance from the point of origin O to the region of the first diffraction grating member 30 provided with these inclination angles increases gradually.

For example, a collimated beam corresponding to a field angle $\theta$ within a range of 1.3° to 6.0° (=incident angle [−$\theta$]) enters the second diffraction grating layer 30B within a region of L≈36 to 51 mm and is diffracted and reflected within this region of the second diffraction grating layer 30B. The collimated beam undergoes total reflection three times off the second surface 21B of the light guide plate 21 and then enters the second diffraction grating member 40 where the beam is diffracted and reflected. Subsequently, the beam is released from the light guide plate 21 and is guided to the eye 50. In this case, the inclination angles $\phi$ of the interference fringes of the second diffraction grating layer 30B, which diffracts and reflects collimated beams at the same wavelength, increase as the field angle $\theta$ changes in the positive direction, and the distance from the point of origin O to the region of the second diffraction grating layer 30B provided with these inclination angles increases gradually.

On the other hand, if the field angle $\theta$ is 1.3° or less, a collimated beam corresponding to a field angle $\theta$ within a range of −6.0° to 1.3° (=incident angle [−$\theta$]) enters the first diffraction grating layer 30A within a region of L≈36 mm to 52 mm and is diffracted and reflected within this region of the first diffraction grating layer 30A. The collimated beam undergoes total reflection four times off the second surface 21B of the light guide plate 21 and then enters the second diffraction grating member 40 where the beam is diffracted and reflected. Subsequently, the beam is released from the light guide plate 21 and is guided to the eye 50. Similarly, in this case, the inclination angles $\phi$ of the interference fringes of the first diffraction grating layer 30A, which diffracts and reflects collimated beams at the same wavelength, increase as the field angle $\theta$ changes in the positive direction, and the distance from the point of origin O to the region of the first diffraction grating layer 30A provided with these inclination angles increases gradually.

Although there are cases where a collimated beam corresponding to a field angle $\theta$ within a range of −6.0° to 1.3° (=incident angle [−$\theta$]) may enter the second diffraction grating layer 30B, such a collimated beam is rarely diffracted and reflected by the second diffraction grating layer 30B since the diffraction efficiency for such a collimated beam within the second diffraction grating layer 30B is low. Likewise, there are cases where a collimated beam corresponding to a field angle $\theta$ within a range of 1.3° to 6.0° (=incident angle [−$\theta$]) may enter the first diffraction grating layer 30A. However, since the diffraction efficiency for such a collimated beam within the first diffraction grating layer 30A is low, such a collimated beam is rarely diffracted and reflected by the first diffraction grating layer 30A.

A region of L≈36 mm in the first diffraction grating layer 30A, which is where a collimated beam corresponding to field angle $\theta_{1=-\theta1\_0}=-6.0°$ is diffracted and reflected, has an interference fringe with a minimum inclination angle $\phi_{MIN}$. In an outer region $RG_{OUT}$ (i.e. a region up to L=52 mm) of the first diffraction grating layer 30A, which is positioned farther away from the second diffraction grating member 40 than the minimum inclination angle region $RG_{MIN}$ (corresponding to L≈36 mm) having the interference fringe with the minimum inclination angle $\phi_{MIN}$, the inclination angles $\phi$ of the interference fringes increase with increasing distance from the minimum inclination angle region $RG_{MIN}$ (corresponding to L≈36 mm). Furthermore, a region of the first diffraction grating layer 30A (corresponding to the region of L=52 mm), in which a collimated beam corresponding to the collimated beam to be given the field angle $\theta_{1=-\theta1\_0}$ is diffracted and reflected, has an interference fringe with a maximum inclination angle $\phi_{MAX}$.

On the other hand, a region of L≈36 mm in the second diffraction grating layer 30B, which is where a collimated beam corresponding to field angle $\theta_{2=-\theta2\_0}=1.3°$ is diffracted and reflected, has an interference fringe with a minimum inclination angle $\phi_{MIN}$. In an outer region $RG_{OUT}$ (i.e. a region up to L=51 mm) of the second diffraction grating layer 30B, which is positioned farther away from the second diffraction grating member 40 than the minimum inclination angle region $RG_{MIN}$ (corresponding to L≈36 mm) having the interference fringe with the minimum inclination angle $\phi_{MIN}$, the inclination angles $\phi$ of the interference fringes increase with increasing distance from the minimum inclination angle region $RG_{MIN}$ (corresponding to L≈36 mm). Furthermore, a region of the second diffraction grating layer 30B (corresponding to the region of L=51 mm), in which a collimated beam corresponding to the collimated beam to be given the field angle $\theta_2=\theta_{2\_0}$ is diffracted and reflected, has an interference fringe with a maximum inclination angle $\phi_{MAX}$.

In this case, since each of the diffraction grating layers does not have a region that extends closer towards the second diffraction grating member 40 from the minimum inclination angle region $RG_{MIN}$, the condition (b) described in the first embodiment is disregarded.

Figure 4B:
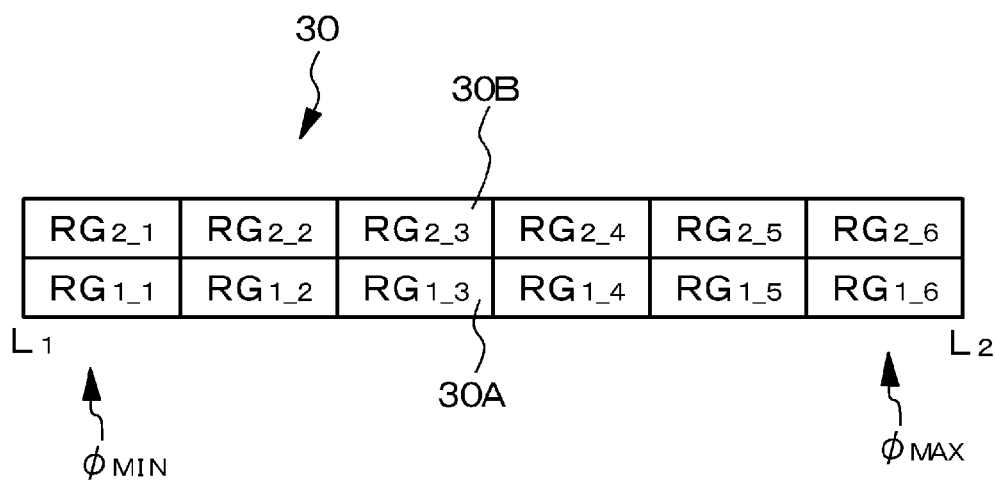
FIG. 4B is a schematic cross-sectional view of the first diffraction grating member according to the third embodiment.

The inclination angles $\phi$ in the outer region $RG_{OUT}$ may increase continuously and monotonously in accordance with the increase of distance L. Alternatively, as shown in the schematic cross-sectional view of the first diffraction grating member 30 in FIG. 4B, the inclination angles $\phi$ in the outer region $RG_{OUT}$ may increase in a stepwise and monotonous manner in accordance with the increase of distance L. In other words, the first diffraction grating member 30 may be divided into S sections (S=6) in the axial direction of the light guide plate 21. In this case, an inclination angle in an s-th section $RG_{(q,s)}$ [$RG_{(1,1)}$, $RG_{(1,2)}$, $RG_{(1,3)}$, $RG_{(1,4)}$, $RG_{(1,5)}$, $RG_{(1,6)}$] of the first diffraction grating layer 30A (s=1, 2, ..., 6) may be fixed, and an inclination angle in an s-th section $RG_{(q,s)}$ [$RG_{(2,1)}$, $RG_{(2,2)}$, $RG_{(2,3)}$, $RG_{(2,4)}$, $RG_{(2,5)}$, $RG_{(2,6)}$] of the second diffraction grating layer 30B may be fixed. Moreover, inclination angles in the sections of the diffraction grating layers 30A, 30B may be set differently when the s-values are different. Furthermore, the stacking order of the first diffraction grating layer 30A and the second diffraction grating layer 30B may be inverted.

Table 10 below shows the relationship between a range of a distance $L_{1\_s}$ of each section $RG_{(q,s)}$, a field angle $\theta_{1\_s}$ (=incident angle $[-\theta]_{1\_s}$), and an inclination angle $\phi_{1\_s}$.

TABLE 10

| (q, s) | Dist. $L_{1\_s}$ (mm) | Field Angle $\theta_{1\_s}$ (°) | Incl. Angle $\phi_{1\_s}$ (°) |
|---|---|---|---|
| Total Reflection: 3 times | | | |
| (2, 1) | 36.0 to 38.25 | 1.74 | 29.97 |
| (2, 2) | 38.25 to 40.75 | 2.8 | 30.36 |
| (2, 3) | 40.75 to 43.25 | 3.7 | 30.72 |
| (2, 4) | 43.25 to 45.75 | 4.5 | 31.07 |
| (2, 5) | 45.75 to 48.5 | 5.2 | 31.40 |
| (2, 6) | 48.5 to 52.0 | 5.8 | 31.70 |
| Total Reflection: 4 times | | | |
| (1, 1) | 36.0 to 38.25 | −5.4 | 28.03 |
| (1, 2) | 38.25 to 40.75 | −4.0 | 28.34 |
| (1, 3) | 40.75 to 43.25 | −2.9 | 28.60 |
| (1, 4) | 43.25 to 45.75 | −1.75 | 28.90 |
| (1, 5) | 45.75 to 48.5 | −0.76 | 29.17 |
| (1, 6) | 48.5 to 52.0 | 0.08 | 29.42 |

In the third embodiment, the first diffraction grating member 30 is given a multilayer structure so that the length of the first diffraction grating member 30 can be reduced in the axial direction of the light guide plate 21 while achieving a larger field angle.

Fourth Embodiment

A fourth embodiment is also a modification of the first embodiment. In the fourth embodiment, the various parameters shown in Table 3 of the first embodiment are changed to parameters shown in Table 11 below.

TABLE 11

| | |
|---|---|
| Thickness t of Light Guide Plate 21: | 2 mm |
| Eye Relief d: | 20 mm |
| Pitch of Interference Fringes of First Diffraction Grating Member 30: | 402.2 nm |
| Field Angle $\theta_0$: | 8.0° |
| Field Angle $-\theta_0$: | −8.0° |

In the fourth embodiment, the first diffraction grating member 30 includes diffraction grating layers 30A, 30B, 30C, 30D defined by Q layers of reflective volume hologram diffraction gratings (Q=4 in the fourth embodiment). Each of the diffraction grating layers 30A, 30B, 30C, 30D included in the first diffraction grating member 30 has interference fringes extending from within the diffraction grating layer 30A, 30B, 30C, 30D towards surfaces thereof. The interference fringes on the surfaces of each of the diffraction grating layers 30A, 30B, 30C, 30D of the first diffraction grating member 30 are arranged at an equal pitch. Moreover, the interference fringes in the diffraction grating layers 30A, 30B, 30C, 30D are arranged at the same pitch.

The diffraction grating layers 30A, 30B, 30C, 30D of the first diffraction grating member 30 have different minimum inclination angles $\phi_{MIN}$ and different maximum inclination angles $\phi_{MAX}$ with respect to each other.

Figure 5A:
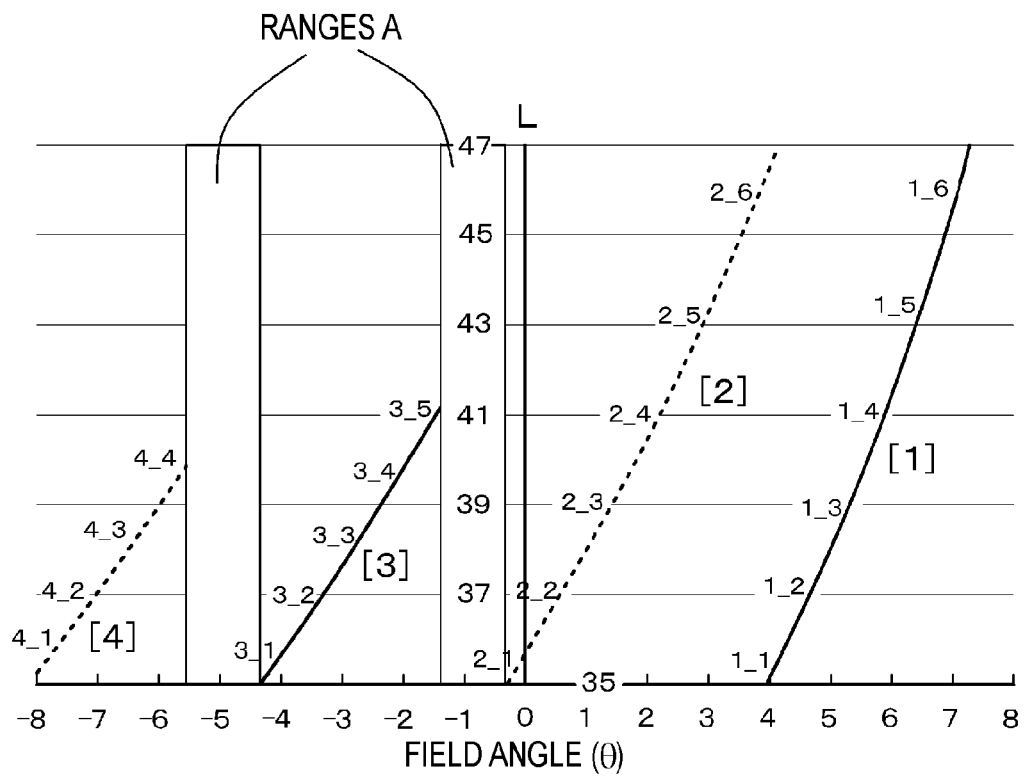
FIG. 5A is a graph that shows a relationship between the number of times a collimated beam undergoes total reflection in a light guide plate, a field angle θ, and an incident position of a collimated beam on a first diffraction grating member in a fourth embodiment.
Figure 5B:
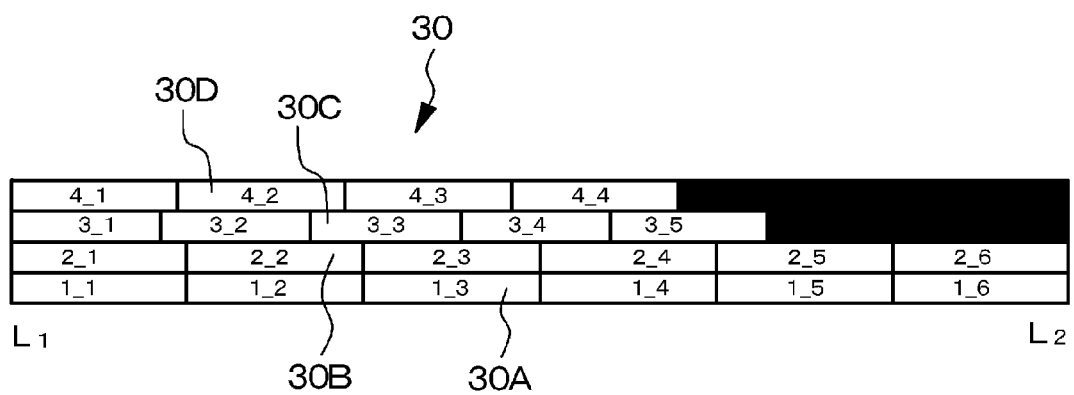
FIG. 5B is a schematic cross-sectional view of the first diffraction grating member according to the fourth embodiment.

FIG. 5A is a graph that shows at which point in the first diffraction grating member 30 a collimated beam with a wavelength λ of 522 nm is diffracted and reflected before entering the center of the eye 50, and also shows the number of times the collimated beam undergoes total reflection off the second surface 21B of the light guide plate 21 before reaching the eye 50. In FIGS. 5A and 5B, each section $RG_{(q,s)}$ is indicated by (q, s) to simplify the drawings.

In FIG. 5A, an upward-sloping solid curve [1] corresponds to a case where the number of times N of total reflection is 4, an upward-sloping dotted curve [2] corresponds to a case where the number of times N of total reflection is 5, an upward-sloping solid curve [3] corresponds to a case where the number of times N of total reflection is 6, and an upward-sloping dotted curve [4] corresponds to a case where the number of times N of total reflection is 7. The fact that the curves shown on the graph increase from left to right implies the same meaning as described in the first embodiment.

A collimated beam corresponding to a field angle θ within a range of 3.9° to 7.2° (=incident angle [−θ]) enters the first diffraction grating layer 30A of the first diffraction grating member 30 within a region of L≈38 to 47 mm and is diffracted and reflected within this region of the first diffraction grating layer 30A. The collimated beam undergoes total reflection four times off the second surface 21B of the light guide plate 21 and then enters the second diffraction grating member 40 where the beam is diffracted and reflected. Subsequently, the beam is released from the light guide plate 21 and is guided to the eye 50. In this case, the inclination angles φ of the interference fringes of the first diffraction grating layer 30A, which diffracts and reflects collimated beams at the same wavelength, increase as the field angle θ changes in the positive direction, and the distance from the point of origin O to the region of the first diffraction grating layer 30A provided with these inclination angles increases gradually.

On the other hand, a collimated beam corresponding to a field angle θ within a range of −0.3° to 3.9° (=incident angle [−θ]) enters the second diffraction grating layer 30B of the first diffraction grating member 30 within a region of L≈38 to 47 mm and is diffracted and reflected within this region of the second diffraction grating layer 30B. The collimated beam undergoes total reflection five times off the second surface 21B of the light guide plate 21 and then enters the second diffraction grating member 40 where the beam is diffracted and reflected. Subsequently, the beam is released from the light guide plate 21 and is guided to the eye 50. Similarly, in this case, the inclination angles φ of the interference fringes of the second diffraction grating layer 30B, which diffracts and reflects collimated beams at the same wavelength, increase as the field angle θ changes in the positive direction, and the distance from the point of origin O to the region of the second diffraction grating layer 30B provided with these inclination angles increases gradually.

Furthermore, a collimated beam corresponding to a field angle θ within a range of −4.3° to −1.5° (=incident angle [−θ]) enters the third diffraction grating layer 30C of the first diffraction grating member 30 within a region of L≈38 to 41 mm and is diffracted and reflected within this region of the third diffraction grating layer 30C. The collimated beam undergoes total reflection six times off the second surface 21B of the light guide plate 21 and then enters the second diffraction grating member 40 where the beam is diffracted and reflected. Subsequently, the beam is released from the light guide plate 21 and is guided to the eye 50. Similarly, in this case, the inclination angles φ of the interference fringes of the third diffraction grating layer 30C, which diffracts and reflects collimated beams at the same wavelength, increase as the field angle θ changes in the positive direction, and the distance from the point of origin O to the region of the third diffraction grating layer 30C provided with these inclination angles increases gradually.

Furthermore, a collimated beam corresponding to a field angle θ within a range of −8.0° to −5.6° (=incident angle [−θ]) enters the fourth diffraction grating layer 30D of the first diffraction grating member 30 within a region of L≈38 to 40 mm and is diffracted and reflected within this region of the fourth diffraction grating layer 30D. The collimated beam undergoes total reflection seven times off the second surface 21B of the light guide plate 21 and then enters the second diffraction grating member 40 where the beam is diffracted and reflected. Subsequently, the beam is released from the light guide plate 21 and is guided to the eye 50. Similarly, in this case, the inclination angles ϕ of the interference fringes of the fourth diffraction grating layer 30D, which diffracts and reflects collimated beams at the same wavelength, increase as the field angle θ changes in the positive direction, and the distance from the point of origin O to the region of the fourth diffraction grating layer 30D provided with these inclination angles increases gradually.

There are cases where a collimated beam incident on one of the diffraction grating layers may enter at least one of the three remaining diffraction grating layers. However, since the diffraction efficiency for such a collimated beam in the remaining diffraction grating layers is low, such a collimated beam is rarely diffracted and reflected by the remaining diffraction grating layers.

A region of L≈35 mm in the first diffraction grating layer 30A, which is where a collimated beam corresponding to field angle $\theta_1=-\theta_{1\_0}=3.9°$ is diffracted and reflected, has an interference fringe with a minimum inclination angle $\phi_{MIN}$. In an outer region $RG_{OUT}$ (i.e. a region up to L=47 mm) of the first diffraction grating layer 30A, which is positioned farther away from the second diffraction grating member 40 than the minimum inclination angle region $RG_{MIN}$ (corresponding to L≈35 mm) having the interference fringe with the minimum inclination angle $\phi_{MIN}$, the inclination angles ϕ of the interference fringes increase with increasing distance from the minimum inclination angle region $RG_{MIN}$ (corresponding to L≈35 mm). Furthermore, a region of the first diffraction grating layer 30A (corresponding to the region of L=47 mm), in which a collimated beam corresponding to the collimated beam to be given the field angle $\theta_1=-\theta_{1\_0}$ is diffracted and reflected, has an interference fringe with a maximum inclination angle $\phi_{MAX}$.

On the other hand, a region of L≈35 mm in the second diffraction grating layer 30B, which is where a collimated beam corresponding to field angle $\theta_2=-\theta_{2\_0}=0.3°$ is diffracted and reflected, has an interference fringe with a minimum inclination angle $\phi_{MIN}$. In an outer region $RG_{OUT}$ (i.e. a region up to L=47 mm) of the second diffraction grating layer 30B, which is positioned farther away from the second diffraction grating member 40 than the minimum inclination angle region $RG_{MIN}$ (corresponding to L≈35 mm) having the interference fringe with the minimum inclination angle $\phi_{MIN}$, the inclination angles ϕ of the interference fringes increase with increasing distance from the minimum inclination angle region $RG_{MIN}$ (corresponding to L≈35 mm). Furthermore, a region of the second diffraction grating layer 30B (corresponding to the region of L=47 mm), in which a collimated beam corresponding to the collimated beam to be given the field angle $\theta_2=\theta_{2\_0}$ is diffracted and reflected, has an interference fringe with a maximum inclination angle $\phi_{MAX}$. p Furthermore, a region of L≈35 mm in the third diffraction grating layer 30C, which is where a collimated beam corresponding to field angle $\theta_3=-\theta_{3\_0}=-4.3°$ is diffracted and reflected, has an interference fringe with a minimum inclination angle $\phi_{MIN}$. In an outer region $RG_{OUT}$ (i.e. a region up to L=41 mm) of the third diffraction grating layer 30C, which is positioned farther away from the second diffraction grating member 40 than the minimum inclination angle region $RG_{MIN}$ (corresponding to L≈35 mm) having the interference fringe with the minimum inclination angle $\phi_{MIN}$, the inclination angles ϕ of the interference fringes increase with increasing distance from the minimum inclination angle region $RG_{MIN}$ (corresponding to L≈35 mm). Furthermore, a region of the third diffraction grating layer 30C (corresponding to the region of L=41 mm), in which a collimated beam corresponding to the collimated beam to be given the field angle $\theta_3=\theta_{3\_0}$ is diffracted and reflected, has an interference fringe with a maximum inclination angle $\phi_{MAX}$.

Furthermore, a region of L≈35 mm in the fourth diffraction grating layer 30D, which is where a collimated beam corresponding to field angle $\theta_4=-\theta_{4\_0}=-8.0°$ is diffracted and reflected, has an interference fringe with a minimum inclination angle $\phi_{MIN}$. In an outer region $RG_{OUT}$ (i.e. a region up to L=40 mm) of the fourth diffraction grating layer 30D, which is positioned farther away from the second diffraction grating member 40 than the minimum inclination angle region $RG_{MIN}$ (corresponding to L≈35 mm) having the interference fringe with the minimum inclination angle $\phi_{MIN}$, the inclination angles ϕ of the interference fringes increase with increasing distance from the minimum inclination angle region $RG_{MIN}$ (corresponding to L≈35 mm). Furthermore, a region of the fourth diffraction grating layer 30D (corresponding to the region of L=40 mm), in which a collimated beam corresponding to the collimated beam to be given the field angle $\theta_4=\theta_{4\_0}$ is diffracted and reflected, has an interference fringe with a maximum inclination angle $\phi_{MAX}$.

In this case, since each of the diffraction grating layers does not have a region that extends closer towards the second diffraction grating member 40 from the minimum inclination angle region $RG_{MIN}$, the condition (b) described in the first embodiment is disregarded.

The inclination angles ϕ in the outer region $RG_{OUT}$ may increase continuously and monotonously in accordance with the increase of distance L. Alternatively, as shown in the schematic cross-sectional view of the first diffraction grating member 30 in FIG. 5B, the inclination angles ϕ in the outer region $RG_{OUT}$ may increase in a stepwise and monotonous manner in accordance with the increase of distance L. In other words, the first diffraction grating member 30 may be divided into S sections (S=6) in the axial direction of the light guide plate 21. In this case, an inclination angle in an s-th section of each of the diffraction grating layers 30A, 30B, 30C, 30D (s=1, 2, . . . , 6) may be fixed, and inclination angles in the sections of each of the diffraction grating layers 30A, 30B, 30C, 30D may be set differently when the s-values are different. Furthermore, the stacking order of the first diffraction grating layer 30A, the second diffraction grating layer 30B, the third diffraction grating layer 30C, and the fourth diffraction grating layer 30D is essentially flexible.

Table 12 below shows the relationship between a range of a distance $L_{1\_s}$ of each section $RG_{(q,s)}$, a field angle $\theta_{1\_s}$ (=incident angle $[-\theta]_{1\_s}$), and an inclination angle $\phi_{1\_s}$.

TABLE 12

| (q, s) | Dist. $L_{1\_s}$ (mm) | Field Angle $\theta_{1\_s}$ (°) | Incl. Angle $\phi_{1\_s}$ (°) |
|---|---|---|---|
| Total Reflection: 4 times | | | |
| (1, 1) | 35 to 37 | 4.02 | 30.86 |
| (1, 2) | 37 to 39 | 4.63 | 31.13 |
| (1, 3) | 39 to 41 | 5.24 | 31.42 |
| (1, 4) | 41 to 43 | 5.85 | 31.72 |
| (1, 5) | 43 to 45 | 6.45 | 32.05 |
| (1, 6) | 45 to 47 | 7.14 | 32.45 |
| Total Reflection: 5 times | | | |
| (2, 1) | 35 to 37 | −0.15 | 29.35 |
| (2, 2) | 37 to 39 | 0.6 | 29.59 |
| (2, 3) | 39 to 41 | 1.44 | 29.87 |
| (2, 4) | 41 to 43 | 2.2 | 30.14 |
| (2, 5) | 43 to 45 | 2.95 | 30.42 |
| (2, 6) | 45 to 47 | 3.87 | 30.79 |
| Total Reflection: 6 times | | | |
| (3, 1) | 35.0 to 36.2 | −4.17 | 28.30 |
| (3, 2) | 36.2 to 37.4 | −3.4 | 28.48 |
| (3, 3) | 37.4 to 38.6 | −2.73 | 28.64 |
| (3, 4) | 38.6 to 39.8 | −2.12 | 28.80 |
| (3, 5) | 39.8 to 41.0 | −1.52 | 28.96 |
| Total Reflection: 7 times | | | |
| (4, 1) | 35.0 to 36.2 | −7.9 | 27.54 |
| (4, 2) | 36.2 to 37.4 | −7.14 | 27.68 |
| (4, 3) | 37.4 to 38.6 | −6.3 | 27.84 |
| (4, 4) | 38.6 to 39.8 | −5.7 | 27.96 |

In the fourth embodiment, the first diffraction grating member 30 is given a multilayer structure with more layers than that in the third embodiment. Thus, the length of the first diffraction grating member 30 can be further reduced in the axial direction of the light guide plate 21 while achieving a larger field angle. In addition, the light guide plate 21 can be reduced in thickness, thereby contributing to further size reduction of the optical device 20 and the image display apparatus 10.

Referring to FIG. 5A, in regions of the first diffraction grating member 30 that correspond to field-angle ranges A, there are no interference fringes with inclination angles that can diffract beams with a desired Bragg condition. Even in this case, there is particularly not a problem if the interference fringes in the regions of the first diffraction grating member that correspond to field angles near each field-angle range A have enough diffraction efficiency for diffracting and reflecting a collimated beam corresponding to the field-angle range A, as shown in FIG. 6. In other words, there is particularly not a problem if a half value h of the angular characteristics for the diffraction efficiency is large enough to an extent that a collimated beam having an incident angle corresponding to the field-angle range A can be diffracted and reflected.

Figure 7A:
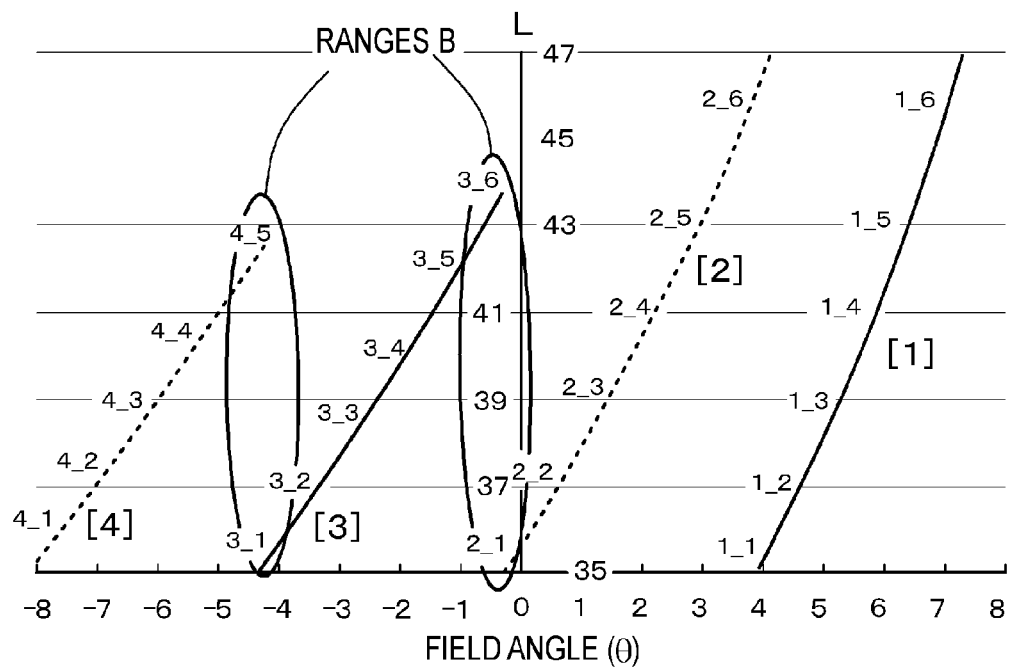
FIG. 7A is a graph that shows a relationship between the number of times a collimated beam undergoes total reflection in a light guide plate, a field angle θ, and an incident position of a collimated beam on a first diffraction grating member according to a modification example of the fourth embodiment.
Figure 7B:
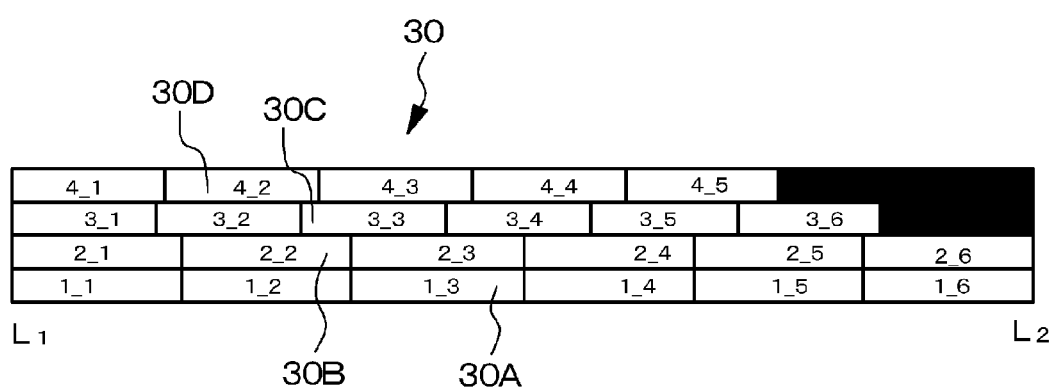
FIG. 7B is a schematic cross-sectional view of the first diffraction grating member according to the modification example of the fourth embodiment.

FIG. 7A is a graph that shows at which point in the first diffraction grating member 30 a collimated beam with a wavelength λ of 522 nm is diffracted and reflected before entering the center of the eye 50, and also shows the number of times the collimated beam undergoes total reflection off the second surface 21B of the light guide plate 21 before reaching the eye 50. As shown in this graph, the first diffraction grating member 30 may have two regions that correspond to field-angle ranges B. This further ensures diffraction and reflection of collimated beams by the first diffraction grating member 30. FIG. 7B is a schematic cross-sectional view of such a first diffraction grating member 30. In FIGS. 7A and 7B, each section $RG_{(q,s)}$ is indicated by (q, s) to simplify the drawings. Table 13 below shows the relationship between a range of a distance $L_{1\_s}$ of each section $RG_{(q,s)}$, a field angle $\theta_{1\_s}$ (=incident angle [−θ]$_{1\_s}$), and an inclination angle 100 $_{1\_s}$. In this case, of Q diffraction grating layers included in the first diffraction grating member 30, the minimum inclination angle in at least one of the diffraction grating layers is set to a value between the minimum inclination angle and the maximum inclination angle in another one of the diffraction grating layers. Or, the maximum inclination angle in the at least one of the diffraction grating layers is set to a value between the minimum inclination angle and the maximum inclination angle in the another one of the diffraction grating layers.

TABLE 13

| (q, s) | Dist. $L_{1\_s}$ (mm) | Field Angle $\theta_{1\_s}$ (°) | Incl. Angle $\phi_{1\_s}$ (°) |
|---|---|---|---|
| Total Reflection: 4 times | | | |
| (1, 1) | 35 to 37 | 4.02 | 30.86 |
| (1, 2) | 37 to 39 | 4.63 | 31.13 |
| (1, 3) | 39 to 41 | 5.24 | 31.42 |
| (1, 4) | 41 to 43 | 5.85 | 31.72 |
| (1, 5) | 43 to 45 | 6.45 | 32.05 |
| (1, 6) | 45 to 47 | 7.14 | 32.45 |
| Total Reflection: 5 times | | | |
| (2, 1) | 35 to 37 | −0.15 | 29.35 |
| (2, 2) | 37 to 39 | 0.6 | 29.59 |
| (2, 3) | 39 to 41 | 1.44 | 29.87 |
| (2, 4) | 41 to 43 | 2.2 | 30.14 |
| (2, 5) | 43 to 45 | 2.95 | 30.42 |
| (2, 6) | 45 to 47 | 3.87 | 30.79 |
| Total Reflection: 6 times | | | |
| (3, 1) | 35.0 to 36.2 | −4.17 | 28.30 |
| (3, 2) | 36.2 to 37.4 | −3.4 | 28.48 |
| (3, 3) | 37.4 to 38.6 | −2.73 | 28.64 |
| (3, 4) | 38.6 to 39.8 | −2.12 | 28.80 |
| (3, 5) | 39.8 to 41.0 | −1.52 | 28.96 |
| Total Reflection: 7 times | | | |
| (4, 1) | 35.0 to 36.2 | −7.9 | 27.54 |
| (4, 2) | 36.2 to 37.4 | −7.14 | 27.68 |
| (4, 3) | 37.4 to 38.6 | −6.3 | 27.84 |
| (4, 4) | 38.6 to 39.8 | −5.7 | 27.96 |
| (4, 5) | 39.8 to 42.5 | −4.17 | 28.30 |

Fifth Embodiment

An optical device and an image display apparatus according to a fifth embodiment of the present invention will now be described. The optical device and the image display apparatus according to the fifth embodiment have substantially the same structure as that shown in FIG. 1.

Figures 8A, 8B, 8C, 8D:
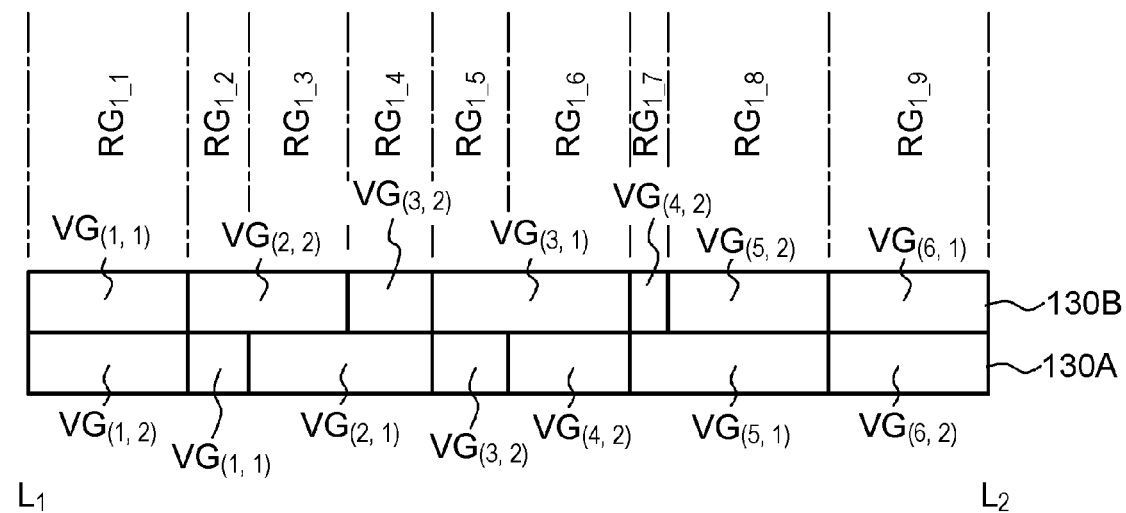
FIG. 8A is a schematic cross-sectional view of a first diffraction grating member in an optical device according to a fifth embodiment.
FIG. 8B is a schematic cross-sectional view of imaginary diffraction grating layers included in the first diffraction grating member when the imaginary diffraction grating layers are supposedly stacked on top of one another.
FIG. 8C is a schematic cross-sectional view of a modified first diffraction grating member in the optical device according to the fifth embodiment.
FIG. 8D is a schematic cross-sectional view of another modified first diffraction grating member in the optical device according to the fifth embodiment.

FIG. 8A is a schematic cross-sectional view of a first diffraction grating member 130 included in the optical device according to the fifth embodiment.

Similar to the first embodiment, the optical device according to the fifth embodiment includes the light guide plate 21, the first diffraction grating member 130, and the second diffraction grating member 40. Specifically, a collimated beam group including a plurality of collimated beams traveling in different directions enters the light guide plate 21, travels through the light guide plate 21 while undergoing total reflection therein, and exits from the light guide plate 21. The first diffraction grating member 130 includes a reflective volume hologram diffraction grating that diffracts and reflects the collimated beam group incident on the light guide plate 21 so as to allow the collimated beam group to undergo total reflection within the light guide plate 21. The second diffraction grating member 40 includes a reflective volume hologram diffraction grating which diffracts and reflects the collimated beam group traveling through the light guide plate 21 while undergoing total reflection therein, and which directly emits the collimated beam group from the light guide plate 21.

FIG. 8B is a schematic cross-sectional view that shows a hypothetical example in which the first diffraction grating member 130 includes imaginary diffraction grating layers 230A, 230B defined by Q layers of reflective volume hologram diffraction gratings (Q=2 in the fifth embodiment). In this case, each of the imaginary diffraction grating layers 230A, 230B has interference fringes on surfaces thereof, which are arranged at an equal pitch. Moreover, the pitch of the interference fringes in the imaginary diffraction grating layer 230A is the same as the pitch of the interference fringes in the imaginary diffraction grating layer 230B. The two imaginary diffraction grating layers 230A, 230B are equivalent to the diffraction grating layers 30A, 30B in the third embodiment shown in FIG. 4B, and moreover, the characteristics of the imaginary diffraction grating layers 230A, 230B are also equivalent to the characteristics of the diffraction grating layers 30A, 30B shown in FIG. 4B. Therefore, with regard to the imaginary diffraction grating layers 230A, 230B, see the above description in the third embodiment.

Furthermore, when an angle formed between each interference fringe in each of the imaginary diffraction grating layers 230A, 230B and one of the surfaces of each of the imaginary diffraction grating layers 230A, 230B is defined as an inclination angle $\phi$, each of the imaginary diffraction grating layers 230A, 230B may have the following conditions:

(a) each imaginary diffraction grating layer has a minimum inclination angle region having an interference fringe with a minimum inclination angle and an outer region positioned farther away from the second diffraction grating member than the minimum inclination angle region, and the inclination angles of the interference fringes in the outer region increase with increasing distance from the minimum inclination angle region, and (b) each imaginary diffraction grating layer has an inner region positioned closer to the second diffraction grating member than the minimum inclination angle region, and the inclination angles of the interference fringes in the inner region include a maximum inclination angle in an inner area disposed adjacent to the minimum inclination angle region and decrease with increasing distance from the minimum inclination angle region.

If the first diffraction grating member 130 is divided into R segments (R=6 in the fifth embodiment) from a section thereof closest to the second diffraction grating member to a section farthest from the second diffraction grating member, an r-th segment $RG_{1\_r}$ of the first diffraction grating member 130 (r=1, 2, ..., R) has a multilayer structure that includes corresponding segments $VG_{(r,\,q)}$ of the Q imaginary diffraction grating layers, the segments $VG_{(r,q)}$ being obtained when each imaginary diffraction grating layer is divided into R segments from a section thereof closest to the second diffraction grating member to a section farthest from the second diffraction grating member (in this case, q is a non-redundant arbitrary integer selected from a range of 1 to Q).

In detail, referring to FIG. 8A, segments of a first diffraction grating layer 130A and a second diffraction grating layer 130B included in the first diffraction grating member 130 are arranged in the order shown in Table 14 below from a side closer to the second diffraction grating member. In Table 14, the segments of the diffraction grating layers that are written in the upper portion are positioned closer to the second diffraction grating member 40.

TABLE 14

| First Grating Layer 130A | Second Grating Layer 130B |
|---|---|
| Segment $VG_{(1,2)}$ | Segment $VG_{(1,1)}$ |
| Segment $VG_{(2,1)}$ | Segment $VG_{(2,2)}$ |
| Segment $VG_{(3,2)}$ | Segment $VG_{(3,1)}$ |
| Segment $VG_{(4,2)}$ | Segment $VG_{(4,1)}$ |
| Segment $VG_{(5,1)}$ | Segment $VG_{(5,2)}$ |
| Segment $VG_{(6,2)}$ | Segment $VG_{(6,1)}$ |

The characteristics of segment $VG_{(1,1)}$, segment $VG_{(2,1)}$, segment $VG_{(3,1)}$, segment $VG_{(4,1)}$, segment $VG_{(5,1)}$, and segment $VG_{(6,1)}$ may be the same as the characteristics of the sections $RG_{(q,s)}$ [$RG_{(1,1)}$, $RG_{(1,2)}$, $RG_{(1,3)}$, $RG_{(1,4)}$, $RG_{(1,5)}$, $RG_{(1,6)}$] of the first diffraction grating layer 30A in the third embodiment. Moreover, the characteristics of segment $VG_{(1,2)}$, segment $VG_{(2,2)}$, segment $VG_{(3,2)}$, segment $VG_{(4,2)}$, segment $VG_{(5,2)}$, and segment $VG_{(6,2)}$ may be the same as the characteristics of the sections $RG_{(q,s)}$ [$RG_{(2,1)}$, $RG_{(2,2)}$, $RG_{(2,3)}$, $RG_{(2,4)}$, $RG_{(2,5)}$, $RG_{(2,6)}$] of the second diffraction grating layer 30B in the third embodiment.

Figure 9:
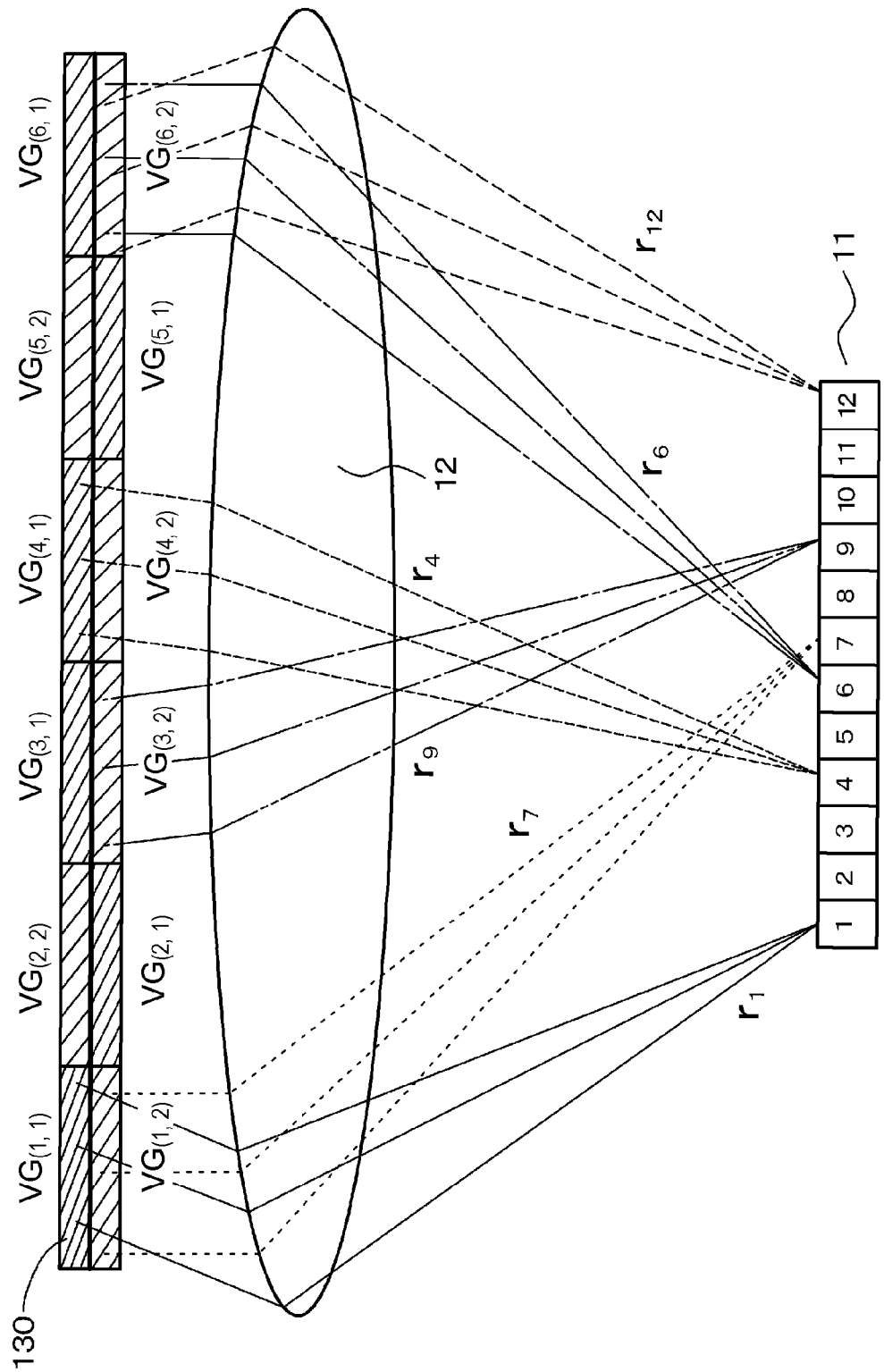
FIG. 9 schematically illustrates a condition of collimated beams incident on the first diffraction grating member having a multilayer structure shown in FIG. 8A.

FIG. 9 schematically illustrates a condition of collimated beams incident on the first diffraction grating member 130 having the multilayer structure shown in FIG. 8A. The light guide plate 21 is not shown in order to simply the drawing. Light beam groups emitted from corresponding pixel positions of the image forming device 11 are collimated by the collimator optical unit 12 and are converted to light beam groups of collimated beams traveling in different directions. Subsequently, the collimated beams pass through the light guide plate 21, not shown, so as to enter the first diffraction grating member 130 shown in FIG. 8A. In this case, a collimated beam $r_1$ incident on the segment $VG_{(1,2)}$ does not undergo diffraction and reflection off the segment $VG_{(1,2)}$, but enters the segment $VG_{(1,1)}$ where the collimated beam $r_1$ is diffracted and reflected.

Figure 10:
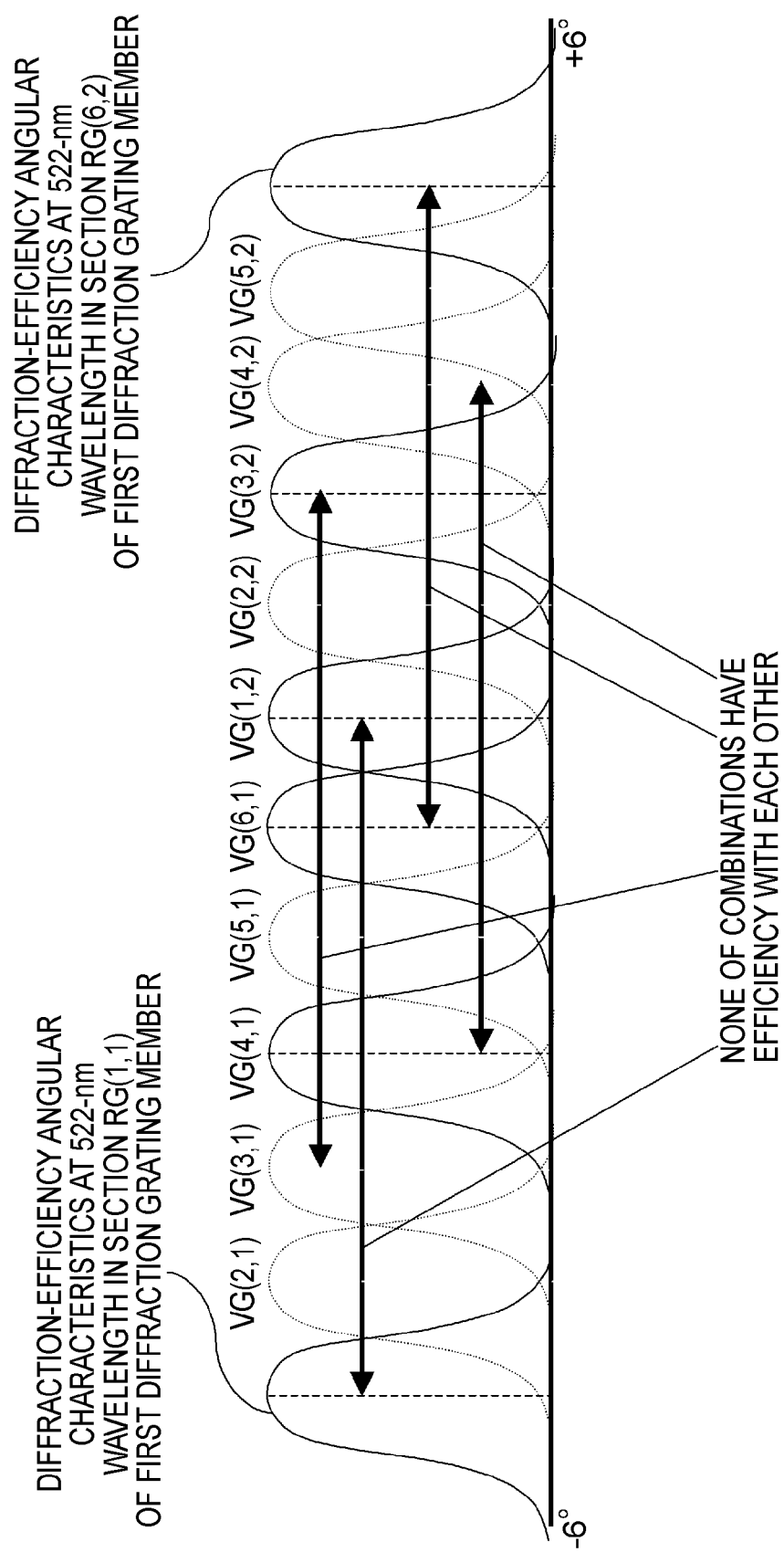
FIG. 10 illustrates whether or not a light beam incident on diffraction grating layers of a multilayer structure is diffracted and reflected.
Figure 11:
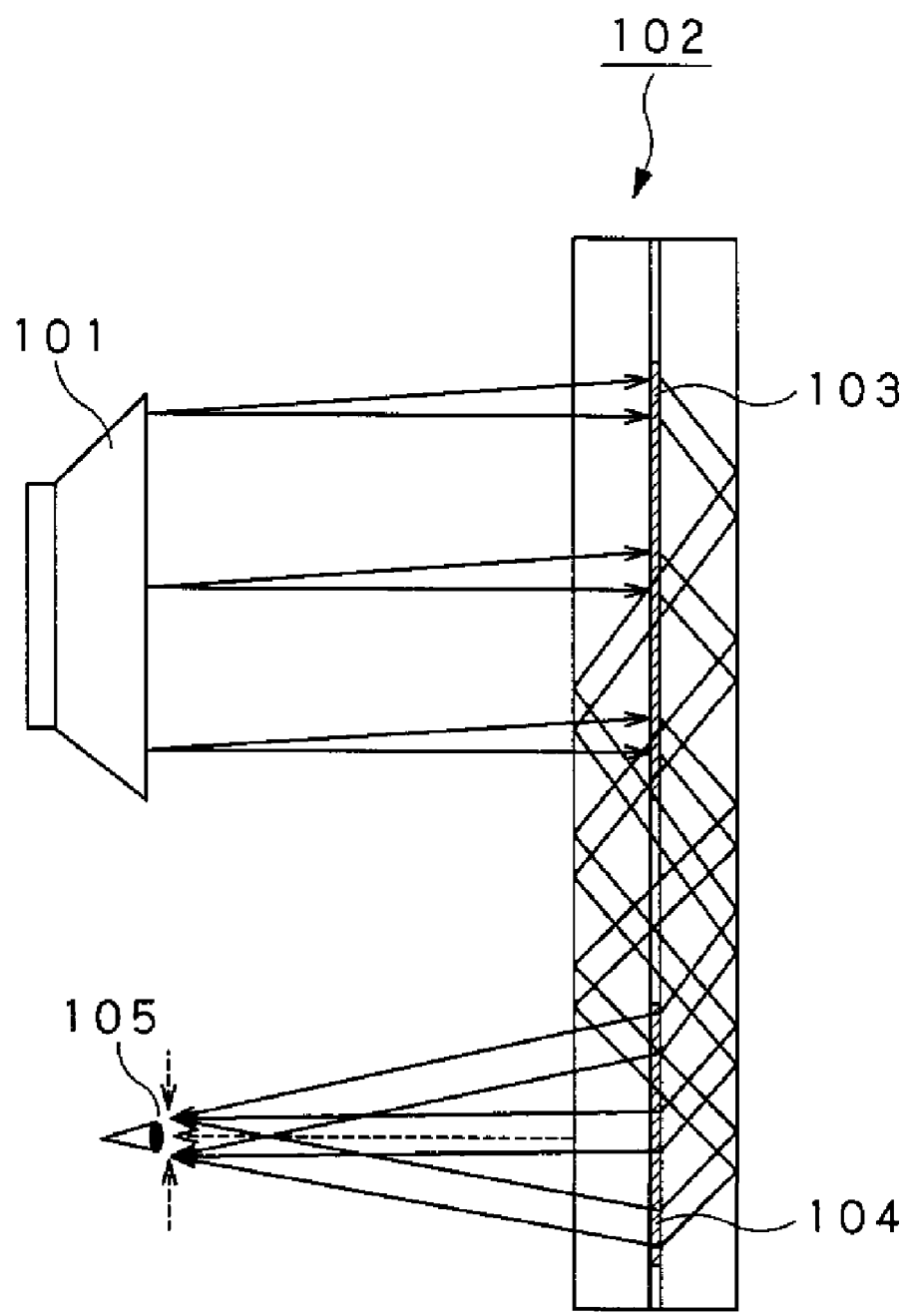
FIG. 11 schematically illustrates a virtual-image display apparatus disclosed in PCT Japanese Translation Patent Publication No. 8-507879.
Figure 12A:
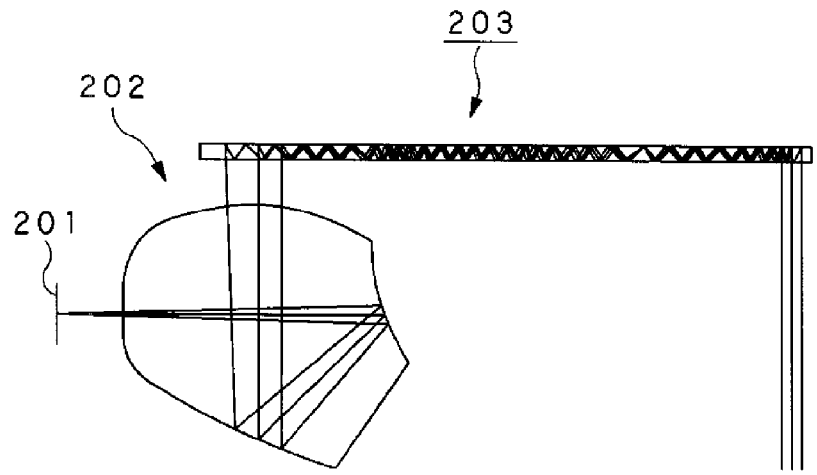
FIGS. 12A and 12B schematically illustrate a virtual-image display apparatus disclosed in Japanese Unexamined Patent Application Publication No. 2002-162598.
Figure 12B:
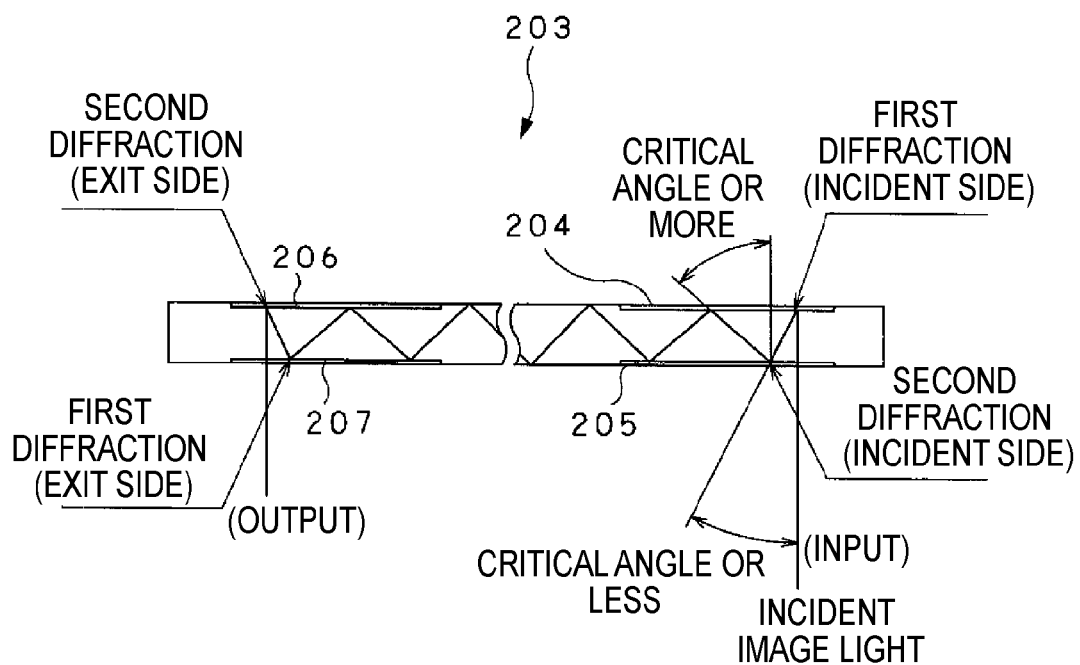
Figure 13:
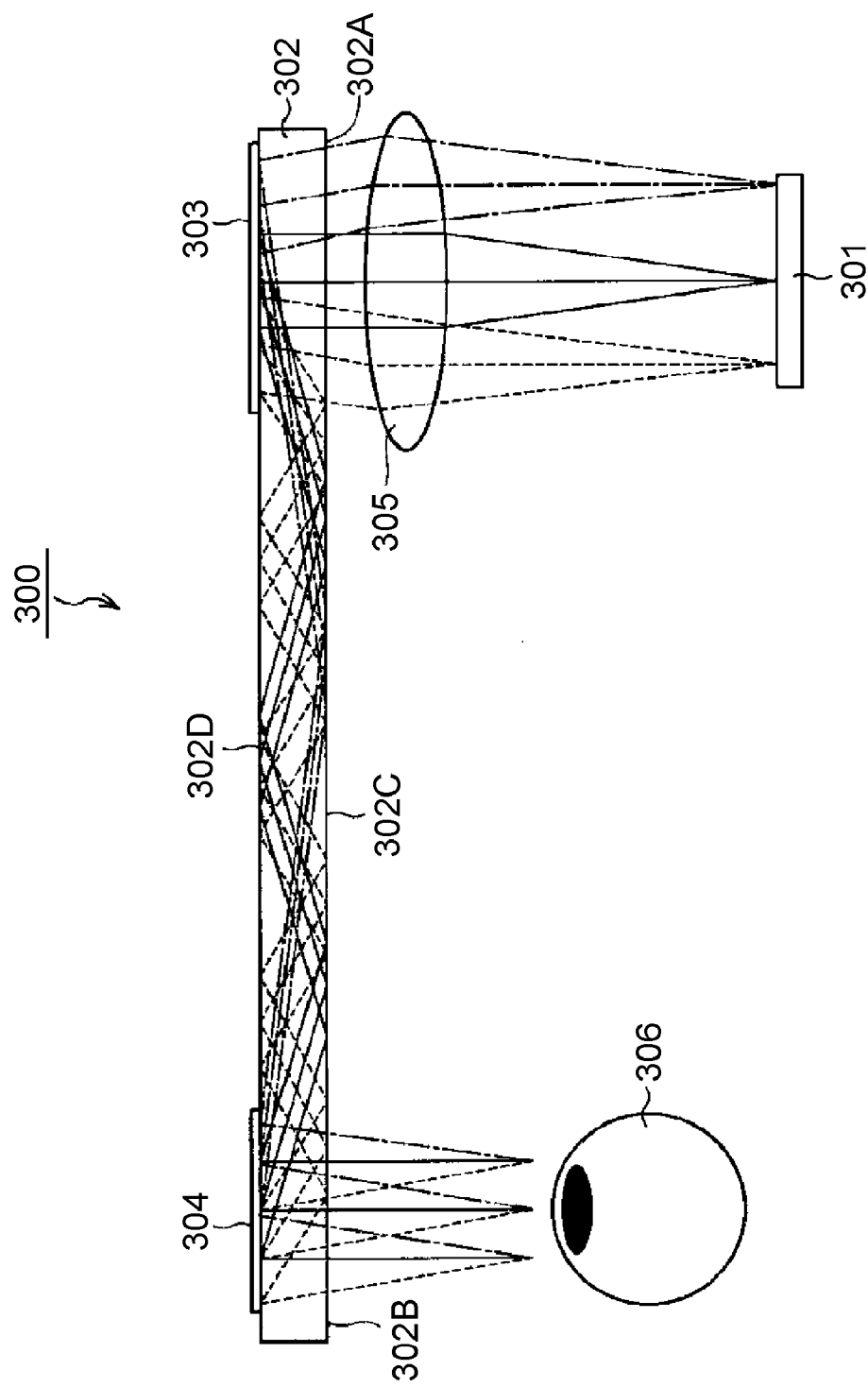
FIG. 13 schematically illustrates a virtual-image display apparatus disclosed in Japanese Patent Application No. 2004-97222.
Figure 14:
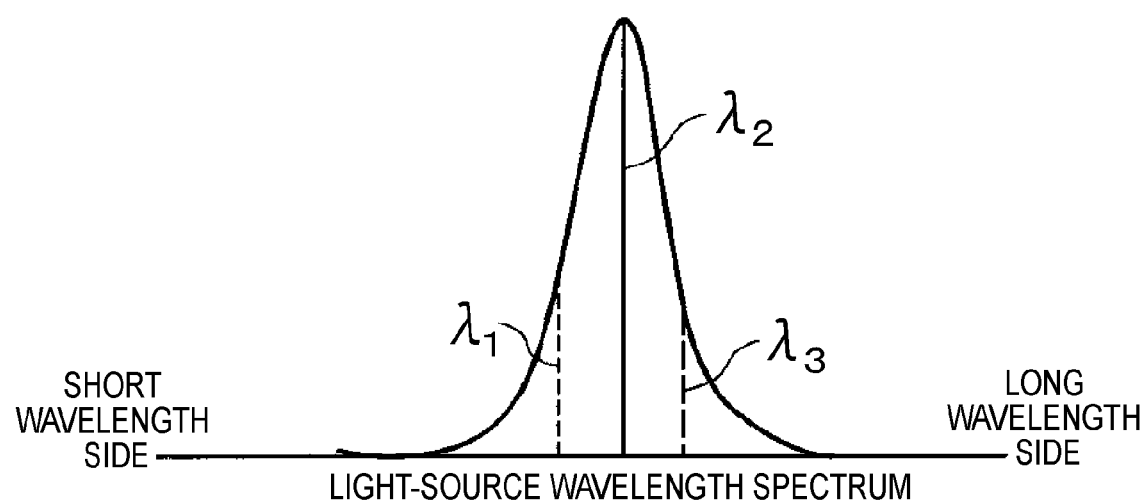
FIG. 14 schematically illustrates a wavelength spectrum of light for forming an image, which is emitted from an image display apparatus defining a virtual-image display apparatus.

In other words, because the collimated beam $r_1$ has an incident angle in the most positive direction (i.e. a field angle $-\theta_0$ in the most negative direction), the collimated beam $r_1$ is diffracted and reflected by the segment $VG_{(1,1)}$ based on a predetermined Bragg condition and travels through the light guide plate 21 while repetitively undergoing total reflection therein. On the other hand, the collimated beam $r_1$ is rarely diffracted and reflected by the segment $VG_{(1,2)}$. Specifically, as shown in FIG. 10, this is due to the fact that the angular characteristics for diffraction efficiency in each segment $VG_{(r,q)}$ are not large enough to cover the angular characteristics for diffraction efficiency in the other segment $VG_{(r,q)}$ stacked on the same position.

Moreover, because the stacked diffraction grating layers 130A, 130B have an extremely small thickness, such as 20 µm, the diffraction grating layers have substantially the same characteristics as those described in the third embodiment and prevent displacement of total reflection positions of the collimated beam $r_1$ and a collimated beam $r_7$. The stacking order of the first diffraction grating layer 130A and the second diffraction grating layer 130B may be inverted.

The center of the second diffraction grating member 40 is defined as a point of origin O. A normal line of the second diffraction grating member 40 extending through the point of origin O is defined as an X-axis. An axis line of the light guide plate 21 extending through the point of origin O is defined as a Y-axis. Of assumed collimated beams assumedly diffracted and reflected by a q-th imaginary diffraction grating layer and subsequently by the second diffraction grating member 40 and positioned within the X-Y plane, q being an integer selected from 1 to Q, an angle formed by an observation point (eye 50) on the X-axis for observing an image corresponding to a collimated beam group diffracted and reflected by the second diffraction grating member 40 and released from the light guide plate 21 and one of the assumed collimated beams positioned closest to the first diffraction grating member 130 is defined as a field angle $\theta_q=\theta_{q\_0}$ (>0). An angle formed by the observation point (eye 50) and one of the assumed collimated beams positioned farthest from the first diffraction grating member 130 is defined as a field angle $\theta_q=-\theta_{q\_0}$ (<0). Under these conditions, a region of the q-th imaginary diffraction grating layer that diffracts and reflects an assumed collimated beam corresponding to the assumed collimated beam to be given the field angle $\theta_q=\theta_{q\_0}$ has a maximum inclination angle, and a region of the q-th imaginary diffraction grating layer that diffracts and reflects an assumed collimated beam corresponding to the assumed collimated beam to be given the field angle $\theta_q=-\theta_{q\_0}$ has a minimum inclination angle.

The present invention is not limited to the above-described preferred embodiments. For example, in the first to fourth embodiments, the first diffraction grating member 30 may be provided with P kinds of interference fringes so as to set substantially the same angle for the diffraction and reflection of P kinds of light beams that are to form the collimated beams and that have different wavelength ranges (or wavelengths). Similarly, in the fifth embodiment, each of the imaginary diffraction grating layers may be provided with P kinds of interference fringes so as to set substantially the same angle for the diffraction and reflection of P kinds of light beams that are to form the collimated beams and that have different wavelength ranges (or wavelengths).

In the fifth embodiment, the sections (regions) of the diffraction grating layers included in the first diffraction grating member and the segments of the imaginary diffraction grating layers correspond to each other in a one-to-one fashion. As an alternative to such a one-to-one arrangement, FIGS. 8C and 8D are schematic cross-sectional views respectively showing a modification example of the first diffraction grating member and a modification example of the multilayer structure of the imaginary diffraction grating layers.

It should be understood by those skilled in the art that various modifications, combinations, sub-combinations and alterations may occur depending on design requirements and other factors insofar as they are within the scope of the appended claims or the equivalents thereof.

What is claimed is:

1. An optical device comprising:
  a light guide plate which receives a collimated beam group including a plurality of collimated beams traveling in different directions, the collimated beam group traveling through the light guide plate while undergoing total reflection therein and then exiting from the light guide plate;
  a first diffraction grating member including a reflective volume hologram diffraction grating that diffracts and reflects the collimated beam group incident on the light guide plate so as to allow the collimated beam group to undergo total reflection within the light guide plate; and
  a second diffraction grating member including a reflective volume hologram diffraction grating that diffracts and reflects the collimated beam group transmitted through the light guide plate and directly emits the collimated beam group from the light guide plate,
  wherein the first diffraction grating member is provided with interference fringes extending from within the first diffraction grating member towards surfaces thereof, the interference fringes on the surfaces of the first diffraction grating member being arranged at an equal pitch,
  wherein when an angle formed between each of the interference fringes in the first diffraction grating member and each surface of the first diffraction grating member is defined as an inclination angle, the first diffraction grating member has the following conditions,
  (a) the first diffraction grating member has a minimum inclination angle region having an interference fringe with a minimum inclination angle; and an outer region positioned farther away from the second diffraction grating member than the minimum inclination angle region, and the inclination angles of the interference fringes in the outer region increase with increasing distance from the minimum inclination angle region, and
  (b) the first diffraction grating member has an inner region positioned closer to the second diffraction grating member than the minimum inclination angle region, and the inclination angles of the interference fringes in the inner region include a maximum inclination angle in an inner area disposed adjacent to the minimum inclination angle region and decrease with increasing distance from the minimum inclination angle region.

2. The optical device according to claim 1, wherein the interference fringes in the first diffraction grating member include P kinds of interference fringes so as to set substantially the same angle for diffraction and reflection of P kinds of light beams having different wavelength ranges and defining the collimated beams, P being an integer.

3. The optical device according to claim 1, wherein when the center of the second diffraction grating member is defined as a point of origin, when a normal line of the second diffraction grating member extending through the point of origin is defined as an X-axis, when an axis line of the light guide plate extending through the point of origin is defined as a Y-axis, when an angle formed by an observation point on the X-axis for observing an image corresponding to the collimated beam group diffracted and reflected by the second diffraction grating member and released from the light guide plate and one of the collimated beams positioned closest to the first diffraction grating member is defined as a field angle $\theta=\theta_0$, and when an angle formed by the observation point and another one of the collimated beams positioned farthest from the first diffraction grating member is defined as a field angle $\theta=-\theta_0$, the collimated beams being diffracted and reflected by the second diffraction grating member and positioned within an X-Y plane, a collimated beam corresponding to the collimated beam to be given the field angle $\theta=\theta_0$ is diffracted and reflected by the first diffraction grating member at a position where the interference fringe having the maximum inclination angle is provided, and a collimated beam corresponding to the collimated beam to be given the field angle $\theta=-\theta_0$ is diffracted and reflected by the first diffraction grating member at a position where the interference fringe having the minimum inclination angle is provided.

4. The optical device according to claim 1, wherein the first diffraction grating member includes diffraction grating layers defined by Q layers of reflective volume hologram diffraction gratings, Q being an integer,
  wherein the interference fringes are provided in each of the diffraction grating layers of the first diffraction grating member and extend from within each diffraction grating layer towards surfaces thereof, and
  wherein the interference fringes on the surfaces of each diffraction grating layer are arranged at an equal pitch, and the interference fringes in the diffraction grating layers are arranged at the same pitch.

5. The optical device according to claim 4, wherein the diffraction grating layers in the first diffraction grating member have different minimum inclination angles and different maximum inclination angles with respect to each other.

6. The optical device according to claim 4, wherein a minimum inclination angle in at least one of the diffracting grating layers of the first diffraction grating member is set to a value between a minimum inclination angle and a maximum inclination angle in another one of the diffracting grating layers, or a maximum inclination angle in said at least one of the diffraction grating layers is set to a value between the minimum inclination angle and the maximum inclination angle in said another one of the diffracting grating layers.

7. The optical device according to claim 4, wherein when the center of the second diffraction grating member is defined as a point of origin, when a normal line of the second diffraction grating member extending through the point of origin is defined as an X-axis, when an axis line of the light guide plate extending through the point of origin is defined as a Y-axis, when an angle formed by an observation point on the X-axis for observing an image corresponding to the collimated beam group diffracted and reflected by the second diffraction grating member and released from the light guide plate and one of the collimated beams positioned closest to the first diffraction grating member is defined as a field angle $\theta_q = \theta_{q\_0}$, and when an angle formed by the observation point and another one of the collimated beams positioned farthest from the first diffraction grating member is defined as a field angle $\theta_q = -\theta_{q\_0}$, the collimated beams being diffracted and reflected by a q-th diffraction grating layer and subsequently by the second diffraction grating member and positioned within an X-Y plane, q being an integer selected from 1 to Q, a collimated beam corresponding to the collimated beam to be given the field angle $\theta_q = \theta_{q\_0}$ is diffracted and reflected by the q-th diffraction grating layer at a position where the interference fringe having the maximum inclination angle is provided, and a collimated beam corresponding to the collimated beam to be given the field angle $\theta_q = -\theta_{q\_0}$ is diffracted and reflected by the q-th diffraction grating layer at a position where the interference fringe having the minimum inclination angle is provided.

8. The optical device according to claim 1, wherein the number of times the collimated beam group undergoes total reflection within the light guide plate varies depending on an incident angle of the collimated beam group on the light guide plate.

9. An optical device comprising:
a light guide plate which receives a collimated beam group including a plurality of collimated beams traveling in different directions, the collimated beam group traveling through the light guide plate while undergoing total reflection therein and then exiting from the light guide plate;
a first diffraction grating member including a reflective volume hologram diffraction grating that diffracts and reflects the collimated beam group incident on the light guide plate so as to allow the collimated beam group to undergo total reflection within the light guide plate; and
a second diffraction grating member including a reflective volume hologram diffraction grating that diffracts and reflects the collimated beam group transmitted through the light guide plate and directly emits the collimated beam group from the light guide plate,
wherein when the first diffraction grating member supposedly includes imaginary diffraction grating layers defined by Q layers of reflective volume hologram diffraction gratings, Q being an integer, each imaginary diffraction grating layer has interference fringes on surfaces thereof, which are arranged at an equal pitch, the interference fringes in the imaginary diffraction grating layers being arranged at the same pitch,
wherein when an angle formed between each of the interference fringes in each imaginary diffraction grating layer and each surface of the imaginary diffraction grating layer is defined as an inclination angle, each of the imaginary diffraction grating layers has the following conditions,
(a) each imaginary diffraction grating layer has a minimum inclination angle region having an interference fringe with a minimum inclination angle; and an outer region positioned farther away from the second diffraction grating member than the minimum inclination angle region, and the inclination angles of the interference fringes in the outer region increase with increasing distance from the minimum inclination angle region, and
(b) each imaginary diffraction grating layer has an inner region positioned closer to the second diffraction grating member than the minimum inclination angle region, and the inclination angles of the interference fringes in the inner region include a maximum inclination angle in an inner area disposed adjacent to the minimum inclination angle region and decrease with increasing distance from the minimum inclination angle region,
wherein if the first diffraction grating member is divided into R segments from a section thereof closest to the second diffraction grating member to a section farthest from the second diffraction grating member, R being an integer, an r-th segment $RG_{1\_r}$ of the first diffraction grating member has a multilayer structure that includes corresponding segments $VG_{(r,q)}$ of the Q imaginary diffraction grating layers, the segments $VG_{(r,q)}$ being obtained when each imaginary diffraction grating layer is divided into R segments from a section thereof closest to the second diffraction grating member to a section farthest from the second diffraction grating member, q being a non-redundant arbitrary integer selected from a range of 1 to Q.

10. The optical device according to claim 9, wherein the interference fringes in each imaginary diffraction grating layer include P kinds of interference fringes so as to set substantially the same angle for diffraction and reflection of P kinds of light beams having different wavelength ranges and defining the collimated beams, P being an integer.

11. The optical device according to claim 9, wherein when the center of the second diffraction grating member is defined as a point of origin, when a normal line of the second diffraction grating member extending through the point of origin is defined as an X-axis, when an axis line of the light guide plate extending through the point of origin is defined as a Y-axis, when an angle formed by an observation point on the X-axis for observing an image corresponding to the collimated beam group diffracted and reflected by the second diffraction grating member and released from the light guide plate and one of assumed collimated beams positioned closest to the first diffraction grating member is defined as a field angle $\theta_q = \theta_{q\_0}$, and when an angle formed by the observation point and another one of the assumed collimated beams positioned farthest from the first diffraction grating member is defined as a field angle $\theta_q = -\theta_{q\_0}$ the assumed collimated beams being assumedly diffracted and reflected by a q-th diffraction grating layer and subsequently by the second diffraction grating member and positioned within an X-Y plane, q being an integer selected from 1 to Q, an assumed collimated beam corresponding to the assumed collimated beam to be given the field angle $\theta_q=\theta_{q\_0}$ is diffracted and reflected by the q-th diffraction grating layer at a position where the interference fringe having the maximum inclination angle is provided, and an assumed collimated beam corresponding to the assumed collimated beam to be given the field angle $\theta_q=-\theta_{q\_0}$ is diffracted and reflected by the q-th diffraction grating layer at a position where the interference fringe having the minimum inclination angle is provided.

12. The optical device according to claim 9, wherein the number of times the collimated beam group undergoes total reflection within the light guide plate varies depending on an incident angle of the collimated beam group on the light guide plate.

13. An image display apparatus comprising:
an image forming device;
a collimator optical unit configured to collimate light beams emitted from the image forming device; and
an optical device which receives the collimated beams collimated and oriented in different directions by the collimator optical unit, and then guides and emits the collimated beams,
wherein the optical device includes
a light guide plate which receives a collimated beam group defined by the collimated beams oriented in different directions, the collimated beam group traveling through the light guide plate while undergoing total reflection therein and then exiting from the light guide plate,
a first diffraction grating member including a reflective volume hologram diffraction grating that diffracts and reflects the collimated beam group incident on the light guide plate so as to allow the collimated beam group to undergo total reflection within the light guide plate, and
a second diffraction grating member including a reflective volume hologram diffraction grating that diffracts and reflects the collimated beam group transmitted through the light guide plate and directly emits the collimated beam group from the light guide plate,
wherein the first diffraction grating member is provided with interference fringes extending from within the first diffraction grating member towards surfaces thereof, the interference fringes on the surfaces of the first diffraction grating member being arranged at an equal pitch,
wherein when an angle formed between each of the interference fringes in the first diffraction grating member and each surface of the first diffraction grating member is defined as an inclination angle, the first diffraction grating member has the following conditions,
(a) the first diffraction grating member has a minimum inclination angle region having an interference fringe with a minimum inclination angle; and an outer region positioned farther away from the second diffraction grating member than the minimum inclination angle region, and the inclination angles of the interference fringes in the outer region increase with increasing distance from the minimum inclination angle region, and
(b) the first diffraction grating member has an inner region positioned closer to the second diffraction grating member than the minimum inclination angle region, and the inclination angles of the interference fringes in the inner region include a maximum inclination angle in an inner area disposed adjacent to the minimum inclination angle region and decrease with increasing distance from the minimum inclination angle region.

14. An image display apparatus comprising:
an image forming device;
a collimator optical unit configured to collimate light beams emitted from the image forming device; and
an optical device which receives the collimated beams collimated and oriented in different directions by the collimator optical unit, and then guides and emits the collimated beams,
wherein the optical device includes
a light guide plate which receives a collimated beam group defined by the collimated beams oriented in different directions, the collimated beam group traveling through the light guide plate while undergoing total reflection therein and then exiting from the light guide plate,
a first diffraction grating member including a reflective volume hologram diffraction grating that diffracts and reflects the collimated beam group incident on the light guide plate so as to allow the collimated beam group to undergo total reflection within the light guide plate, and
a second diffraction grating member including a reflective volume hologram diffraction grating that diffracts and reflects the collimated beam group transmitted through the light guide plate and directly emits the collimated beam group from the light guide plate,
wherein when the first diffraction grating member supposedly includes imaginary diffraction grating layers defined by Q layers of reflective volume hologram diffraction gratings, Q being an integer, each imaginary diffraction grating layer has interference fringes on surfaces thereof, which are arranged at an equal pitch, the interference fringes in the imaginary diffraction grating layers being arranged at the same pitch,
wherein when an angle formed between each of the interference fringes in each imaginary diffraction grating layer and each surface of the imaginary diffraction grating layer is defined as an inclination angle, each of the imaginary diffraction grating layers has the following conditions,
(a) each imaginary diffraction grating layer has a minimum inclination angle region having an interference fringe with a minimum inclination angle; and an outer region positioned farther away from the second diffraction grating member than the minimum inclination angle region, and the inclination angles of the interference fringes in the outer region increase with increasing distance from the minimum inclination angle region, and
(b) each imaginary diffraction grating layer has an inner region positioned closer to the second diffraction grating member than the minimum inclination angle region, and the inclination angles of the interference fringes in the inner region include a maximum inclination angle in an inner area disposed adjacent to the minimum inclination angle region and decrease with increasing distance from the minimum inclination angle region,
wherein if the first diffraction grating member is divided into R segments from a section thereof closest to the second diffraction grating member to a section farthest from the second diffraction grating member, R being an integer, an r-th segment $RG_{1\_r}$ of the first diffraction grating member has a multilayer structure that includes corresponding segments $VG_{(r,q)}$ of the Q imaginary diffraction grating layers, the segments $VG_{(r,q)}$ being obtained when each imaginary diffraction grating layer is divided into R segments from a section thereof closest to the second diffraction grating member to a section farthest from the second diffraction grating member, q being a non-redundant arbitrary integer selected from a range of 1 to Q.

* * * * *